(12) United States Patent
Yan et al.

(10) Patent No.: US 12,360,066 B2
(45) Date of Patent: Jul. 15, 2025

(54) COMMUNICATION METHOD AND APPARATUS USING A BACKSCATTER SIGNAL PATTERN

(71) Applicant: HUAWEI TECHNOLOGIES CO., LTD., Guangdong (CN)

(72) Inventors: Mao Yan, Chengdu (CN); Kuandong Gao, Chengdu (CN); Huang Huang, Shenzhen (CN); Huajiong Lin, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 210 days.

(21) Appl. No.: 17/891,716

(22) Filed: Aug. 19, 2022

(65) Prior Publication Data

US 2022/0390393 A1 Dec. 8, 2022

Related U.S. Application Data

(63) Continuation of application No. PCT/CN2020/141645, filed on Dec. 30, 2020.

(30) Foreign Application Priority Data

Feb. 27, 2020 (CN) .......................... 202010124344.9

(51) Int. Cl.
*G01N 23/203* (2006.01)
*H04L 7/033* (2006.01)
*H04L 27/144* (2006.01)

(52) U.S. Cl.
CPC .......... *G01N 23/203* (2013.01); *H04L 7/033* (2013.01); *H04L 27/144* (2013.01)

(58) Field of Classification Search
CPC .............. G01N 23/203; G06K 7/0008; G06K 19/0723; H04B 1/40; H04B 1/56;
(Continued)

(56) References Cited

U.S. PATENT DOCUMENTS 5,940,006 A * 8/1999 MacLellan ......... G06K 17/0022
340/505
6,975,600 B1 * 12/2005 Vaughan ................ H04B 7/212
370/321
(Continued)

FOREIGN PATENT DOCUMENTS

CN 109995413 A 7/2019
CN 110635826 A 12/2019
WO 2018081319 A1 5/2018

OTHER PUBLICATIONS

Huynh et al., "Ambient Backscatter Communications: A Contemporary Survey," Submitted on Dec. 13, 2017, arXiv:1712.04804v1, 32 pages.
(Continued)

*Primary Examiner* — Stephen R Burgdorf
(74) *Attorney, Agent, or Firm* — Fish & Richardson P.C.

(57) ABSTRACT

This application relates to the field of communication technologies, and discloses a communication method and apparatus. On example method includes: a backscatter device receives an excitation signal from an exciter. The backscatter device determines a backscatter signal pattern in a backscatter signal pattern set, where the backscatter signal pattern set includes a plurality of backscatter signal patterns, and backscatter reference signals in the plurality of backscatter signal patterns do not overlap in time domain. The backscatter device modulates a backscatter reference signal and a backscatter data signal on the excitation signal based on the determined backscatter signal pattern, to obtain a backscatter signal. The backscatter device sends the backscatter signal to a receiver.

20 Claims, 14 Drawing Sheets

(58) Field of Classification Search
CPC ... H04B 1/69; H04B 5/00; H04B 5/77; H04B 7/026; H04L 1/0006; H04L 5/0044; H04L 5/005; H04L 5/0048; H04L 7/033; H04L 27/04; H04L 27/144; H04L 27/2602; H04L 27/26025; H04L 27/261; H04L 27/2613; H04L 27/2626; H04L 27/2666; H04Q 9/00; H04W 52/0212; H04W 52/18; Y02D 30/70
USPC ...................................................... 340/572.4
See application file for complete search history.

(56) References Cited

U.S. PATENT DOCUMENTS

| | | | | |
|---|---|---|---|---|
| 10,763,990 | B1* | 9/2020 | Vougioukas | H04L 5/14 |
| 2009/0215408 | A1* | 8/2009 | Evers | G01S 13/758 |
| | | | | 455/90.1 |
| 2010/0245053 | A1* | 9/2010 | Overhultz | G06K 7/10316 |
| | | | | 340/10.4 |
| 2015/0227832 | A1* | 8/2015 | Diorio | G06K 19/07756 |
| | | | | 29/601 |
| 2015/0350748 | A1* | 12/2015 | Abuelsaad | H04Q 9/00 |
| | | | | 340/870.07 |
| 2017/0109688 | A1* | 4/2017 | Gregory | G06Q 10/087 |
| 2017/0193256 | A1 | 7/2017 | Jung et al. | |
| 2018/0212807 | A1* | 7/2018 | Zhang | H04B 5/00 |
| 2019/0158341 | A1* | 5/2019 | Talla | H04L 27/26 |
| 2019/0274144 | A1* | 9/2019 | Zhang | H04B 7/22 |
| 2022/0116175 | A1* | 4/2022 | Xin | H04L 5/0048 |

OTHER PUBLICATIONS

Mi et al., "CBMA: Coded-backscatter multiple access," In 2019 IEEE 39th International Conference on Distributed Computing Systems (ICDCS), Jul. 7, 2019, 11 pages.
Zhao et al., "OFDMA-enabled Wi-Fi backscatter," In The 25th Annual International Conference on Mobile Computing and Networking, Aug. 5, 2019, 15 pages.
Extended European Search Report in European Appln No. 20921922.9, dated May 12, 2023, 7 pages.
3GPP TS 36.211 V15.1.0 (Mar. 2018), "3rd Generation Partnership Project; Technical Specification Group Radio Access Network; Evolved Universal Terrestrial Radio Access (E-UTRA); Physical channels and modulation (Release 15)," Mar. 2018, 222 pages.
PCT International Search Report and Written Opinion issued in International Application No. PCT/CN2020/141645 on Mar. 19, 2021, 17 pages (with English translation).
Office Action in Indian Appln. No. 202227043830, dated Nov. 15, 2022, 8 pages (with English translation).
Huynh et al., "Ambient Backscatter Communications: A Contemporary Survey," IEEE Communications Surveys and Tutorials, vol. 20, No. 4, May 29, 2018, 34 pages.

* cited by examiner

COMMUNICATION METHOD AND APPARATUS USING A BACKSCATTER SIGNAL PATTERN

CROSS-REFERENCE TO RELATED APPLICATION

This application is a continuation of International Application No. PCT/CN2020/141645, filed on Dec. 30, 2020, which claims priority to Chinese Patent Application No. 202010124344.9, filed on Feb. 27, 2020. The disclosures of the aforementioned applications are hereby incorporated by reference in their entireties.

TECHNICAL FIELD

Embodiments of this application relates to the field of communication technologies, and in particular, to a communication method and apparatus.

BACKGROUND

Backscatter communication is a passive communication technology with extremely low power consumption and low costs, and is applicable to a scenario such as the internet of things (IoT) that is sensitive to power consumption. In the backscatter communication technology, three nodes: an exciter, a backscatter device, and a receiver may be included. The exciter and the backscatter device may alternatively be integrated into a same node, and the node may be referred to as a reader/writer. The exciter may send a radio signal. The radio signal sent by the exciter may also be referred to as an excitation signal. The excitation signal may be a signal such as a monophonic signal or a multi-tone signal, and does not carry any data. The excitation signal sent by the exciter is a signal known to the backscatter device. After receiving the excitation signal, the backscatter device may modulate, to the excitation signal, data that needs to be sent, to obtain a backscatter signal, and send the backscatter signal to the receiver. After receiving the backscatter signal, the receiver may demodulate the data carried in the backscatter signal.

However, in existing backscatter communication, when a plurality of backscatter devices are simultaneously activated, signals may be simultaneously reflected, causing a signal conflict. Consequently, access of the plurality of backscatter devices fails, and reading efficiency is reduced. For example, time, frequency resources, and power are wasted, and an extra delay is caused.

SUMMARY

Embodiments of this application provide a communication method and apparatus, to resolve a problem of a signal conflict caused when a plurality of backscatter devices simultaneously reflect signals.

According to a first aspect, an embodiment of this application provides a communication method. The method includes: a backscatter device receives an excitation signal from an exciter. The backscatter device determines a backscatter signal pattern in a backscatter signal pattern set, where the backscatter signal pattern set includes a plurality of backscatter signal patterns, and backscatter reference signals in the plurality of backscatter signal patterns do not overlap in time domain. The backscatter device modulates a backscatter reference signal and a backscatter data signal on the excitation signal based on the determined backscatter signal pattern, to obtain a backscatter signal. The backscatter device sends the backscatter signal to a receiver. Optionally, in this embodiment of this application, in the backscatter signal pattern set, backscatter reference signals in different backscatter signal patterns may be located on different channels (frequency bands), and a backscatter reference signal and a backscatter data signal that are modulated by a same backscatter device on an excitation signal may be located on a same channel.

In this embodiment of this application, the backscatter signal pattern set includes the plurality of backscatter signal patterns, and the backscatter reference signals in the plurality of backscatter signal patterns do not overlap in time domain and are orthogonal to each other. A plurality of backscatter devices may send backscatter signals based on different backscatter signal patterns, and backscatter reference signals modulated on the backscatter signals sent by the plurality of backscatter devices do not overlap in time domain. The receiver may detect (or demodulate) the backscatter reference signals sent by the plurality of backscatter devices, and demodulate, based on a channel on which the backscatter reference signal is detected, a backscatter data signal sent by a corresponding backscatter device, so that a conflict between the backscatter signals sent by the plurality of backscatter devices can be avoided.

In a possible design, the excitation signal includes a first time range and a second time range, and a signal time granularity of the excitation signal in the first time range may be different from a signal time granularity of the excitation signal in the second time range. In the foregoing design, the backscatter device may separately modulate the backscatter reference signal and the backscatter data signal in different time ranges, so that the receiver demodulates the backscatter reference signal and the backscatter data signal from the backscatter signal based on the different time ranges.

In a possible design, the signal time granularity of the excitation signal in the first time range may be less than the signal time granularity of the excitation signal in the second time range. In the foregoing design, the excitation signal includes the first time range and the second time range in which signal time granularities are different, so that the backscatter device selects a corresponding time range for modulation based on signal time granularities respectively corresponding to the backscatter reference signal and the backscatter data signal, to reduce system overheads of a communication system.

In a possible design, the excitation signal is mapped in a comb pattern in the first time range and is continuously mapped in the second time range. In the foregoing design, the first time range and the second time range can be identified and determined based on different mapping manners.

In a possible design, a subcarrier spacing used for the excitation signal in the first time range is K times a subcarrier spacing used for the excitation signal in the second time range; or an orthogonal frequency division multiplexing OFDM symbol length used for the excitation signal in the first time range is 1/K time an OFDM symbol length used for the excitation signal in the second time range, where K is an integer. In the foregoing design, the first time range and the second time range can be identified and determined based on different subcarrier spacings or OFDM symbol lengths.

In a possible design, that the backscatter device modulates a backscatter reference signal and a backscatter data signal on the excitation signal based on the determined backscatter signal pattern includes: modulating, by the backscatter device, the backscatter reference signal in the first time range of the excitation signal and the backscatter data signal in the second time range of the excitation signal based on the determined backscatter signal pattern. In the foregoing design, the receiver can estimate a channel of the backscatter data signal based on a channel (frequency band) of the backscatter reference signal in the first time range, to implement coherent demodulation on the backscatter data signals of the plurality of backscatter devices and improve reading performance of backscatter communication.

In a possible design, a first sequence mapped to the excitation signal is continuous in the first time range, and a second sequence mapped to the excitation signal is continuous in the second time range; or a third sequence mapped to the excitation signal is continuous in the first time range and the second time range. In the foregoing design, compared with a segment of sequence separately mapped to one OFDM symbol in an existing communication system, a longer sequence is used, this helps improve performance of synchronization between the receiver and the exciter and improve detection performance of the backscatter device.

In a possible design, that the backscatter device determines a backscatter signal pattern in a backscatter signal pattern set includes: the backscatter device determines the backscatter signal pattern in the backscatter signal pattern set based on identification information of the backscatter device; the backscatter device determines the backscatter signal pattern in the backscatter signal pattern set based on identification information of the backscatter device and a correspondence between identification information of a backscatter device and a backscatter signal pattern in the backscatter signal pattern set; or the backscatter device determines the backscatter signal pattern in the backscatter signal pattern set based on backscatter signal indication information received from the exciter or the receiver, where the backscatter signal indication information includes indication information indicating a backscatter signal pattern in the backscatter signal pattern set. In the foregoing design, the backscatter device can accurately and quickly determine the backscatter signal pattern.

According to a second aspect, an embodiment of this application provides a communication method. The method includes: an exciter generates an excitation signal, where the excitation signal includes a first time range and a second time range, and a signal time granularity of the excitation signal in the first time range may be different from a signal time granularity of the excitation signal in the second time range. The exciter sends the excitation signal to a backscatter device. In the foregoing design, the backscatter device may separately modulate a backscatter reference signal and a backscatter data signal in different time ranges, so that a receiver demodulates the backscatter reference signal and the backscatter data signal from a backscatter signal based on the different time ranges.

In a possible design, the signal time granularity of the excitation signal in the first time range may be less than the signal time granularity of the excitation signal in the second time range. In the foregoing design, the excitation signal includes the first time range and the second time range in which signal time granularities are different, so that the backscatter device selects a corresponding time range for modulation based on signal time granularities respectively corresponding to the backscatter reference signal and the backscatter data signal, to reduce system overheads of a communication system.

In a possible design, the excitation signal is mapped in a comb pattern in the first time range and is continuously mapped in the second time range. In the foregoing design, the first time range and the second time range can be identified and determined based on different mapping manners.

In a possible design, a subcarrier spacing used for the excitation signal in the first time range is K times a subcarrier spacing used for the excitation signal in the second time range; or an orthogonal frequency division multiplexing (OFDM) symbol length used for the excitation signal in the first time range is 1/K time an OFDM symbol length used for the excitation signal in the second time range, where K is an integer. In the foregoing design, the first time range and the second time range can be identified and determined based on different subcarrier spacings or OFDM symbol lengths.

In a possible design, a first sequence mapped to the excitation signal is continuous in the first time range, and a second sequence mapped to the excitation signal is continuous in the second time range; or a third sequence mapped to the excitation signal is continuous in the first time range and the second time range. In the foregoing design, compared with a segment of sequence separately mapped to one OFDM symbol in an existing communication system, a longer sequence is used, this helps improve performance of synchronization between the receiver and the exciter and improve detection performance of the backscatter device.

According to a third aspect, an embodiment of this application provides a communication method. The method includes: a receiver receives a backscatter signal from a backscatter device. The receiver detects, based on a backscatter signal pattern set, a backscatter reference signal modulated on the backscatter signal, where the backscatter signal pattern set includes a plurality of backscatter signal patterns, and the backscatter reference signals in the plurality of backscatter signal patterns do not overlap in time domain. The receiver demodulates, based on a channel on which the backscatter reference signal is detected, a backscatter data signal modulated on the backscatter signal. Optionally, in this embodiment of this application, in the backscatter signal pattern set, backscatter reference signals in different backscatter signal patterns may be located on different channels (frequency bands), and a backscatter reference signal and a backscatter data signal that are modulated by a same backscatter device on an excitation signal may be located on a same channel.

In the foregoing design, the backscatter signal pattern set includes the plurality of backscatter signal patterns, and the backscatter reference signals in the plurality of backscatter signal patterns do not overlap in time domain and are orthogonal to each other. A plurality of backscatter devices may send backscatter signals based on different backscatter signal patterns, and backscatter reference signals modulated on the backscatter signals sent by the plurality of backscatter devices do not overlap in time domain. The receiver may detect (or demodulate) the backscatter reference signals sent by the plurality of backscatter devices, and demodulate, based on a channel on which the backscatter reference signal is detected, a backscatter data signal sent by a corresponding backscatter device, so that a conflict between the backscatter signals sent by the plurality of backscatter devices can be avoided.

In a possible design, the backscatter signal includes a first time range and a second time range, and a signal time granularity of the backscatter signal in the first time range may be different from a signal time granularity of the backscatter signal in the second time range. In the foregoing design, the backscatter device may separately modulate the backscatter reference signal and the backscatter data signal in different time ranges, so that the receiver demodulates the backscatter reference signal and the backscatter data signal from the backscatter signal based on the different time ranges.

In a possible design, the signal time granularity of the backscatter signal in the first time range may be less than the signal time granularity of the backscatter signal in the second time range. In the foregoing design, the excitation signal includes the first time range and the second time range in which signal time granularities are different, so that the backscatter device selects a corresponding time range for modulation based on signal time granularities respectively corresponding to the backscatter reference signal and the backscatter data signal, to reduce system overheads of a communication system.

In a possible design, that the receiver detects, based on a backscatter signal pattern set, a backscatter reference signal modulated on the backscatter signal includes: the receiver detects, in the first time range of the backscatter signal based on the backscatter signal pattern set, the backscatter reference signal modulated on the backscatter signal. That the receiver demodulates, based on a channel on which the backscatter reference signal is detected, a backscatter data signal modulated on the backscatter signal includes: the receiver demodulates, in the second time range of the backscatter signal based on the channel on which the backscatter reference signal is detected, the backscatter data signal modulated on the backscatter signal. In the foregoing design, the receiver can estimate a channel of the backscatter data signal based on a channel of the backscatter reference signal in the first time range, to implement coherent demodulation on the backscatter data signals of the plurality of backscatter devices and improve reading performance of backscatter communication.

According to a fourth aspect, an embodiment of this application provides a communication apparatus. The apparatus has a function of implementing the method in the first aspect. The function may be implemented by hardware, or may be implemented by hardware executing corresponding software. The hardware or the software includes one or more modules corresponding to the function, for example, a transceiver unit and a processing unit.

In a possible design, the apparatus may be a chip or an integrated circuit.

In a possible design, the apparatus includes a memory and a processor. The memory is configured to store a program or instructions executed by the processor. When the program or the instructions are executed by the processor, the apparatus may perform the method in the first aspect.

In a possible design, the apparatus may be a backscatter device.

According to a fifth aspect, an embodiment of this application provides a communication apparatus. The apparatus has a function of implementing the method in the second aspect. The function may be implemented by hardware, or may be implemented by hardware executing corresponding software. The hardware or the software includes one or more modules corresponding to the function, for example, a transceiver unit and a processing unit.

In a possible design, the apparatus may be a chip or an integrated circuit.

In a possible design, the apparatus includes a memory and a processor. The memory is configured to store a program or instructions executed by the processor. When the program or the instructions are executed by the processor, the apparatus may perform the method in the second aspect.

In a possible design, the apparatus may be an exciter.

According to a sixth aspect, an embodiment of this application provides a communication apparatus. The apparatus has a function of implementing the method in the third aspect. The function may be implemented by hardware, or may be implemented by hardware executing corresponding software. The hardware or the software includes one or more modules corresponding to the function, for example, a transceiver unit and a processing unit.

In a possible design, the apparatus may be a chip or an integrated circuit.

In a possible design, the apparatus includes a memory and a processor. The memory is configured to store a program or instructions executed by the processor. When the program or the instructions are executed by the processor, the apparatus may perform the method in the third aspect.

In a possible design, the apparatus may be a backscatter device.

According to a seventh aspect, an embodiment of this application provides a computer-readable storage medium, where the computer-readable storage medium is configured to store a program or instructions. When the program or the instructions are executed, the method in the first aspect, the method in the second aspect, or the method in the third aspect is implemented.

According to an eighth aspect, an embodiment of this application provides a computer program product including instructions. When the instructions are executed, the method in the first aspect, the method in the second aspect, or the method in the third aspect is implemented.

According to a ninth aspect, an embodiment of this application provides a chip. The chip is configured to execute a computer program or instructions stored in a memory, to implement the method in the first aspect, the method in the second aspect, or the method in the third aspect.

For technical effects that can be achieved in the fourth aspect to the ninth aspect, refer to the technical effects that can be achieved in the first aspect, the second aspect, or the third aspect. Details are not described herein again.

DESCRIPTION OF EMBODIMENTS

Embodiments of this application may be applied to various mobile communication systems, for example, a new radio (NR) system, a long term evolution (LTE) system, a long term evolution-advanced (LTE-A) system, a universal mobile telecommunications system (UMTS), an evolved long term evolution (eLTE) system, a future communication system, and another communication system. Specifically, this is not limited herein. For example, an architecture of a communication system to which embodiments of this application are applied may be that shown in FIG. 1, and includes an exciter, a backscatter device, and a receiver.

It should be noted that the exciter may alternatively have another name, for example, may be referred to as a helper, an interrogator, a reader, or user equipment (UE). For ease of description, the exciter is used in embodiments of this application. Correspondingly, the backscatter device may alternatively have another name, for example, may be referred to as a tag, a backscatter device, a passive device, a semi-active device, an ambient signal device, or a radio frequency identification (RFID) tag. For ease of description, the backscatter device is used in embodiments of this application. The receiver may alternatively have another name, for example, may be referred to as an access point or a base station. For ease of description, the receiver is used in embodiments of this application. Correspondingly, in embodiments of this application, backscatter communication may also be referred to as passive communication, ambient communication, or the like.

Figure 1:
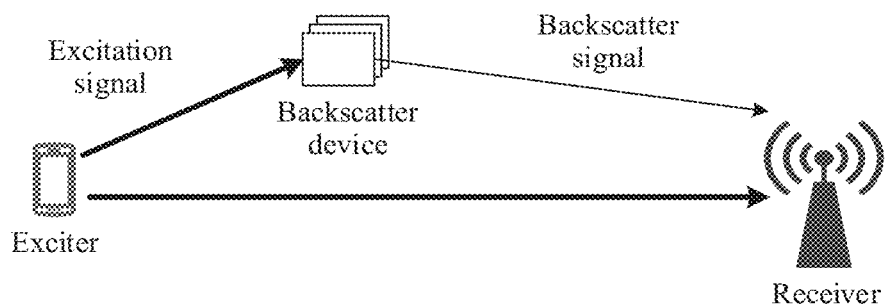
FIG. 1 is a schematic diagram of a communication architecture according to an embodiment of this application.

In FIG. 1, an excitation signal sent by the exciter may be a monophonic signal (namely, a continuous sine wave) or a multi-tone signal (namely, a signal having a specific bandwidth), and the excitation signal may carry data sent to the receiver, or may not carry data sent to the receiver. The excitation signal sent by the exciter is a signal known to the backscatter device. There may be at least one gap within duration of the excitation signal, and the at least one gap may be periodic or aperiodic.

Figure 2:
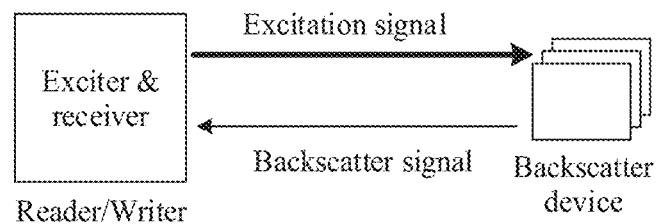
FIG. 2 is a schematic diagram of a communication architecture according to an embodiment of this application.

After receiving the excitation signal, the backscatter device may modulate, to the excitation signal, data that needs to be sent, to obtain a backscatter signal, and send the backscatter signal to the receiver. The data sent by the backscatter device may be collected temperature data, humidity data, or the like. This is not limited in embodiments of this application. In embodiments of this application, the backscatter device may be a passive device. To be specific, no power supply is required in a process of receiving the excitation signal and sending the backscatter signal. Alternatively, the backscatter device may be a semi-passive device. To be specific, a power supply is required in a process of receiving the excitation signal or sending the backscatter signal. It should be understood that FIG. 1 is merely an example. In a possible implementation, the exciter and the receiver may alternatively be integrated into a same physical entity. As shown in FIG. 2, in a radio frequency identification (RFID) system, the exciter and the receiver are integrated into a same node, which is referred to as a reader/writer.

It should be noted that, in the communication system shown in FIG. 1, the receiver cannot directly send data to the backscatter device. If the receiver needs to send data to the backscatter device, the receiver needs to first send the data to the exciter, and the exciter forwards the data to the backscatter device.

When the backscatter communication is applied to a mobile communication system, for example, 5G, the exciter may be a terminal device and the receiver is a network device; the exciter is a network device and the receiver is a terminal device; both the exciter and the receiver are user equipment; or both the exciter and the receiver are network devices. The terminal device may be a mobile phone, a tablet computer (Pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The network device may be a wireless access device, for example, an evolved NodeB (eNB), a gNB in 5G, a radio network controller (RNC), a NodeB (NB), a base station controller (BSC), a base transceiver station (BTS), a home base station (for example, a home evolved NodeB, or a home NodeB, HNB), a baseband unit (BBU), an access point (AP) in a wireless fidelity (Wi-Fi) system, a wireless relay node, or a wireless backhaul node.

Before embodiments of this application are described, some terms in embodiments of this application are first described, to help persons skilled in the art have a better understanding.

(1) Modulation and demodulation: Modulation is a process of processing data of a signal source and adding the data to a carrier, to enable the data to become a form suitable for channel transmission. Different modes correspond to different modulation methods, for example, multicarrier modulation, single-carrier modulation, phase-shift keying (PSK) modulation, or amplitude-shift keying (ASK) modulation. Demodulation is an inverse process of modulation, and original data is restored from a signal. Demodulation may also be referred to as detection sometimes.

(2) Orthogonal frequency division multiplexing (OFDM) is a multicarrier transmission waveform of frequency division multiplexing, and signals (also referred to as carriers/subcarriers) participating in multiplexing are orthogonal. An OFDM technology converts a high-speed data stream into a plurality of parallel low-speed data streams through serial/parallel conversion, and then allocates the low-speed data streams to subchannels on several subcarriers of different frequencies for transmission. The OFDM technology uses mutually orthogonal subcarriers, so that spectrums of the subcarriers overlap, to greatly improve spectrum utilization.

Figure 3:
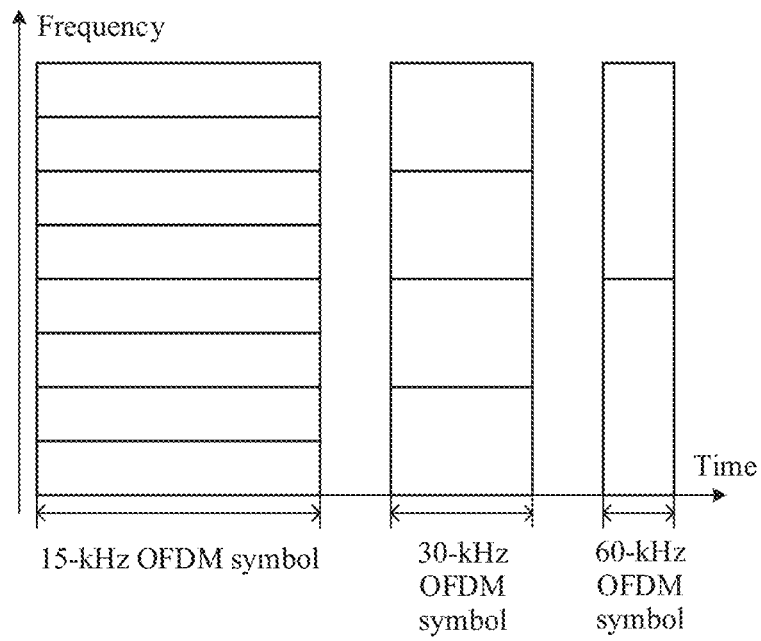
FIG. 3 is a schematic diagram of a subcarrier and a subcarrier width according to an embodiment of this application.

(3) Subcarrier. In a multicarrier waveform, a transmitted signal is a bandwidth signal, the bandwidth signal includes many signals of different frequencies, and intervals between these frequencies are the same. These different frequencies are referred to as subcarriers. Data of a network device and a terminal device may be modulated to these subcarriers, and these subcarriers are orthogonal within a period of time. A 15-kHz subcarrier spacing (SCS), a 30-kHz SCS, and a 60-kHz SCS that are currently supported by a cellular system are used as an example. A subcarrier and a subcarrier width are those shown in FIG. 3. Each frequency domain space is one subcarrier, and may be used to transmit data.

(4) Reference signal (RS): Reference signals may be classified into a demodulation reference signal (DMRS), a channel state information reference signal (CSI-RS), a phase tracking reference signal (PTRS), and the like based on functions of the reference signals. A transmit end or a receive end may infer time and frequency positions of a signal and a channel transmitting a signal/symbol carried at the time and frequency positions, or another unexpected phenomenon according to a known or preset rule. The reference signal is a known signal used to obtain impact of the outside (for example, a spatial channel, or non-ideality of a transmit or receive end device) during transmission of the signal, and is usually used for channel estimation and assistance in signal demodulation and detection. For example, the DMRS and the CSI-RS are used to obtain channel information, and the PTRS is used to obtain phase change information. In this application, the reference signal is also referred to as a reference symbol, a reference bit, or the like. In this application, a data signal is also referred to as a data symbol, a data bit, or the like. If a signal is sent by the backscatter device, a limitation is added. For example, a reference signal sent by the backscatter device is referred to as a "backscatter reference signal", and a data signal sent by the backscatter device is referred to as a "backscatter data signal".

It should be noted that the communication system and the service scenario described in embodiments of this application are intended to describe the technical solutions in embodiments of this application more clearly, and do not constitute a limitation on the technical solutions provided in embodiments of this application. Persons of ordinary skill in the art may know that: with the evolution of the network architecture and the emergence of new service scenarios, the technical solutions provided in embodiments of this application are also applicable to similar technical problems.

The following describes in detail embodiments of this application with reference to the accompanying drawings. In addition, it should be understood that in embodiments of this application, "at least one" may also be described as "one or more", and "a plurality of" may be "two, three, four, or more". This is not limited in this application.

In embodiments of this application, "/" may indicate an "or" relationship between associated objects. For example, A/B may represent A or B. The term "and/or" may indicate that there are three relationships between associated objects. For example, A and/or B may indicate the following three cases: only A exists, both A and B exist, and only B exists, where A and B may be singular or plural. To facilitate descriptions of the technical solutions in embodiments of this application, terms such as "first" and "second" may be used to distinguish between technical features with a same or similar function in embodiments of this application. The terms such as "first" and "second" do not limit a quantity and an execution sequence, and the terms such as "first" and "second" do not indicate a definite difference. In embodiments of this application, the word such as "example" or "for example" is used to represent giving an example, an illustration, or a description. Any embodiment or design scheme described as "example" or "for example" should not be explained as being more preferred or advantageous over another embodiment or design scheme. Use of the word such as "example" or "for example" is intended to present a related concept in a specific manner for ease of understanding.

Embodiment 1

Figure 4:
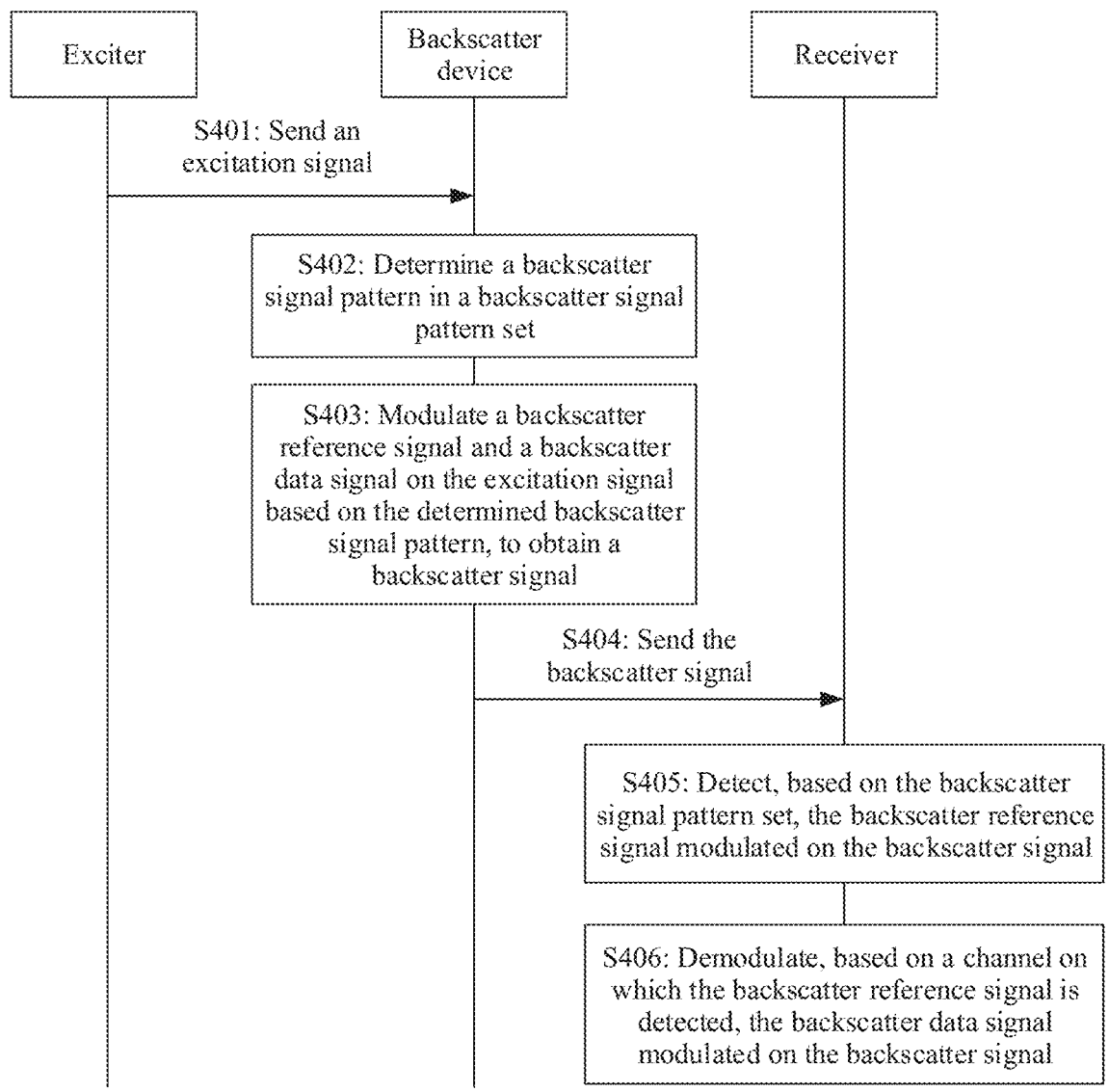
FIG. 4 is a schematic diagram of a communication process according to an embodiment of this application.

FIG. 4 is a schematic diagram of a communication process according to an embodiment of this application. The process includes the following steps.

S401: An exciter sends an excitation signal to a backscatter device, and the backscatter device receives the excitation signal from the exciter.

Figure 5:
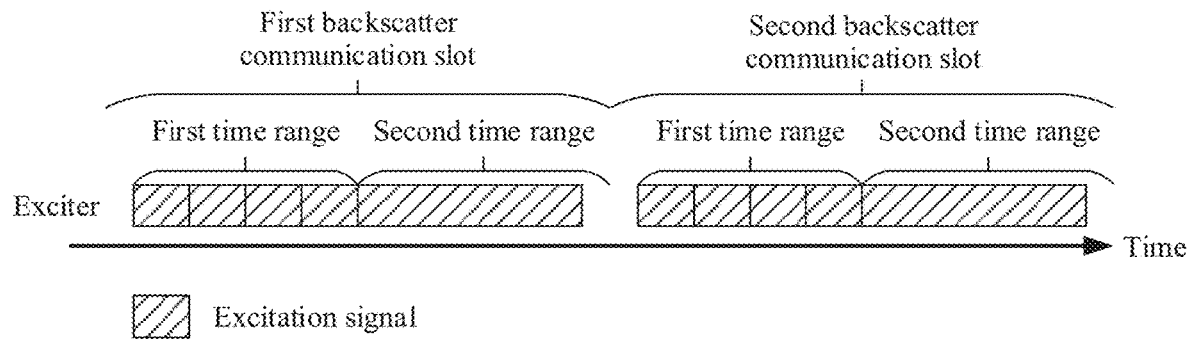
FIG. 5 is a schematic diagram of a signal time granularity of an excitation signal according to an embodiment of this application.

In this embodiment of this application, a signal time granularity (time or duration of each signal) may be used for the excitation signal. In other words, signal time granularities for modulating a backscatter reference signal and a backscatter data signal by the backscatter device on the excitation signal are consistent. Optionally, to reduce overheads caused by the backscatter reference signal to a communication system, the excitation signal sent by the exciter may include a first time range and a second time range in which signal time granularities are different. As shown in FIG. 5, a signal time granularity in the first time range may be less than a signal time granularity in the second time range, the first time range of the excitation signal is used by the backscatter device to modulate the backscatter reference signal, and the second time range is used by the backscatter device to modulate the backscatter data signal.

Optionally, to facilitate identifying and determining different time ranges of the excitation signal by the backscatter device and a receiver, in a possible implementation, the excitation signal may be mapped in a comb pattern in the first time range and continuously mapped in the second time range.

Figure 6A:
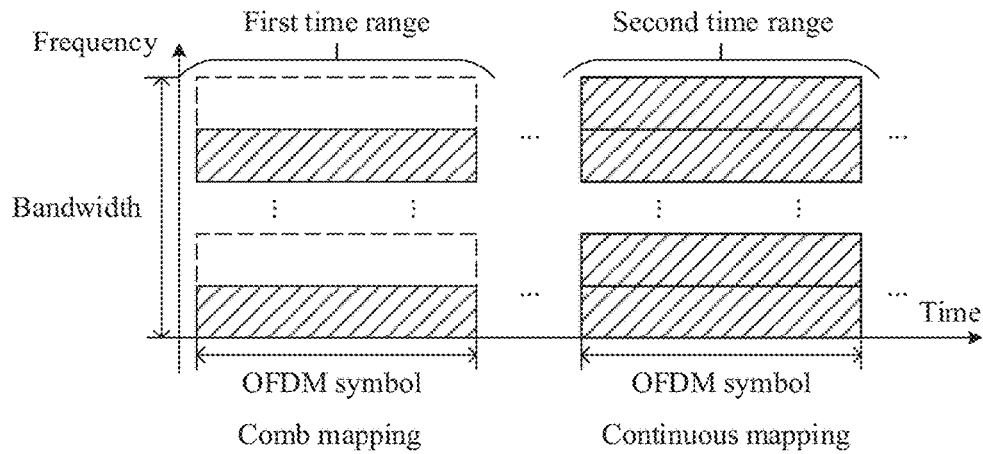
FIG. 6A and FIG. 6B are schematic diagrams of time-frequency structures of excitation signals according to an embodiment of this application.

For example, a frequency domain density of comb mapping used for the excitation signal in the first time range may be 1/N, where N may be a positive integer such as 2, 3, 4, or 5. In other words, information (or data) about the excitation signal is mapped to one subcarrier at an interval of N subcarriers for the excitation signal in the first time range. For example, N is 2. As shown in FIG. 6A, the information about the excitation signal is mapped to one subcarrier at an interval of two subcarriers for the excitation signal in the first time range.

In another possible implementation, a subcarrier spacing used for the excitation signal in the first time range is different from a subcarrier spacing used for the excitation signal in the second time range. In other words, an OFDM symbol length used for the excitation signal in the first time range is different from an OFDM symbol length used for the excitation signal in the second time range.

Figure 6B:
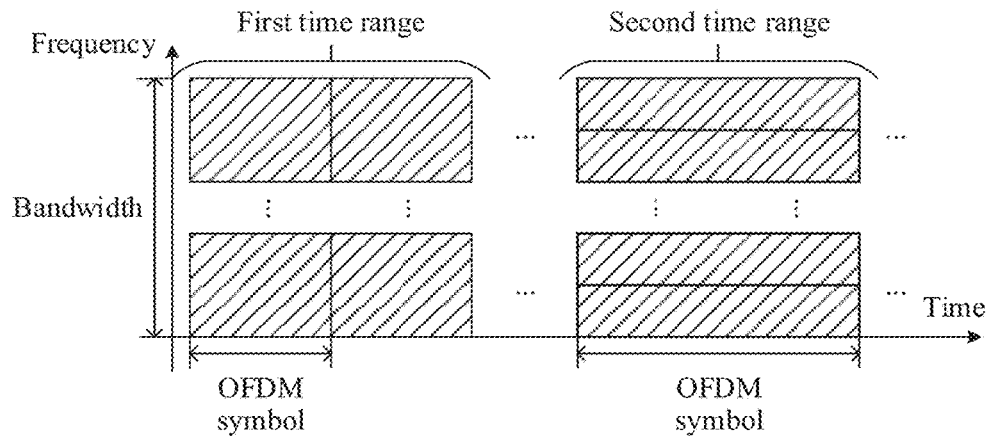

For example, the subcarrier spacing used for the excitation signal in the first time range is K times the subcarrier spacing used for the excitation signal in the second time range, or correspondingly, the OFDM symbol length used for the excitation signal in the first time range is 1/K time the OFDM symbol length used for the excitation signal in the second time range, where K is an integer such as 2, 3, 4, or 5. For example, K is 2. As shown in FIG. 6B, the subcarrier spacing used for the excitation signal in the first time range is twice the subcarrier spacing used for the excitation signal in the second time range, and the OFDM symbol length used for the excitation signal in the first time range is ½ of the OFDM symbol length used for the excitation signal in the second time range.

In addition, to improve performance of synchronization between the receiver and the exciter and improve detection performance of the backscatter device, in a possible implementation, a third sequence (for example, a pseudo-random sequence) mapped to the excitation signal is continuous in the first time range and the second time range.

Figure 7A:
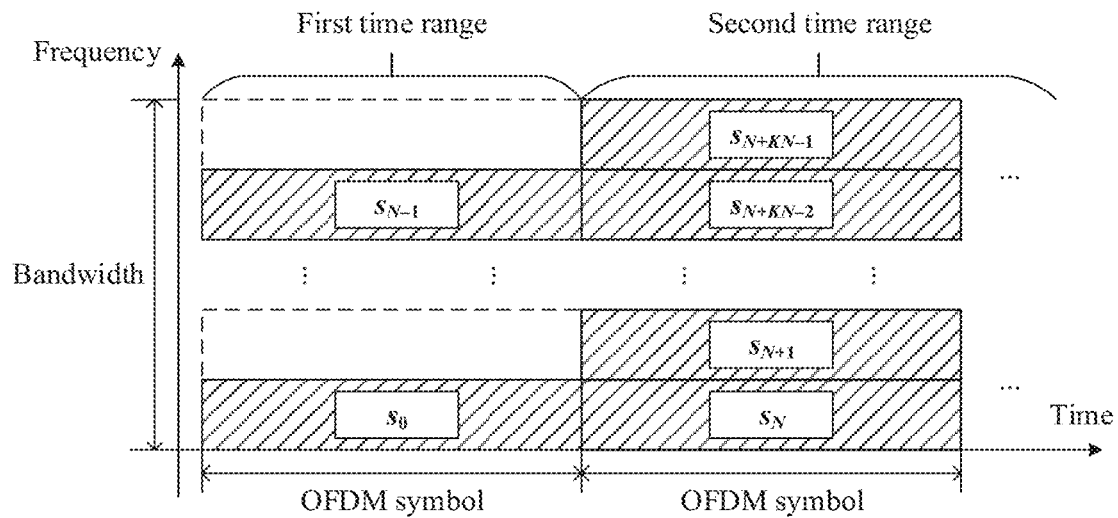
FIG. 7A and FIG. 7B are schematic diagrams of mapping of excitation signals according to an embodiment of this application.
Figure 7B:
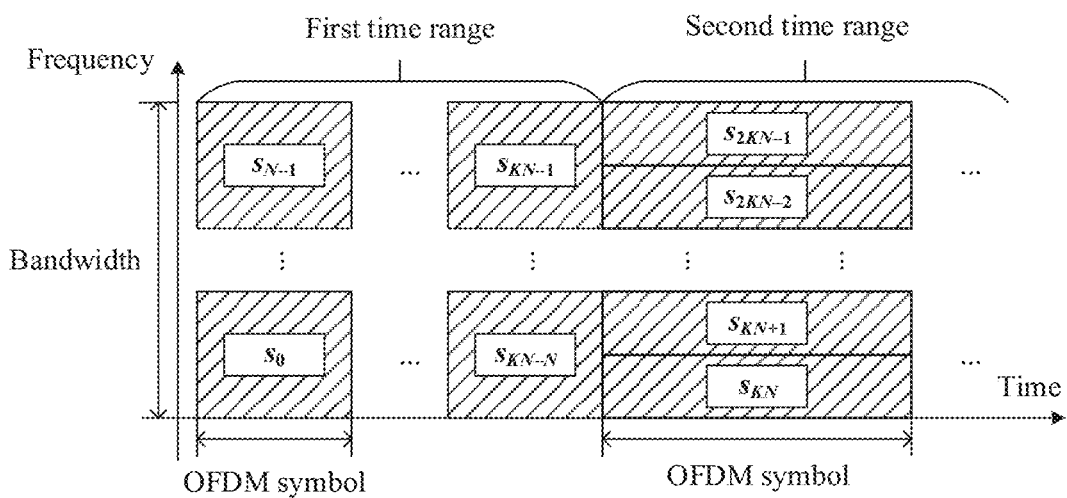

For example, as shown in FIG. 7A and FIG. 7B, a mapping manner of a sequence S may be as follows: first, the sequence S is mapped to subcarriers in ascending order of subcarriers (or frequencies) in frequency domain, where the subcarrier may also be referred to as a resource (resource element, RE): then is mapped in ascending order of OFDM symbols (or in ascending order of time) in a backscatter communication slot (which is a time unit that is one level larger than the OFDM symbol); and finally is mapped in ascending order of backscatter communication slots in a backscatter communication frame (which is a time unit that is one level larger than the backscatter communication slot) until mapping of subcarriers (resources) occupied by the excitation signal is completed. It should be noted that comb mapping is performed in the first time range in FIG. 7A. Therefore, when mapping is performed in the first time range, mapping is performed in order at a comb interval. Mapping is continuously performed in the second time range. Therefore, when mapping is performed in the second time range, mapping may be continuously performed in order. Between the first time range and the second time range, mapping is performed in ascending order of OFDM symbol indexes (if cross-slots are used, the last subcarrier of time of the last OFDM symbol of the former slot and the first subcarrier of time of the first OFDM symbol of the latter slot are "in sequence").

In another possible implementation, a first sequence (for example, a pseudo-random sequence) mapped to the excitation signal is continuous in the first time range, and a second sequence (for example, a pseudo-random sequence) mapped to the excitation signal is continuous in the second time range.

Figure 8A:
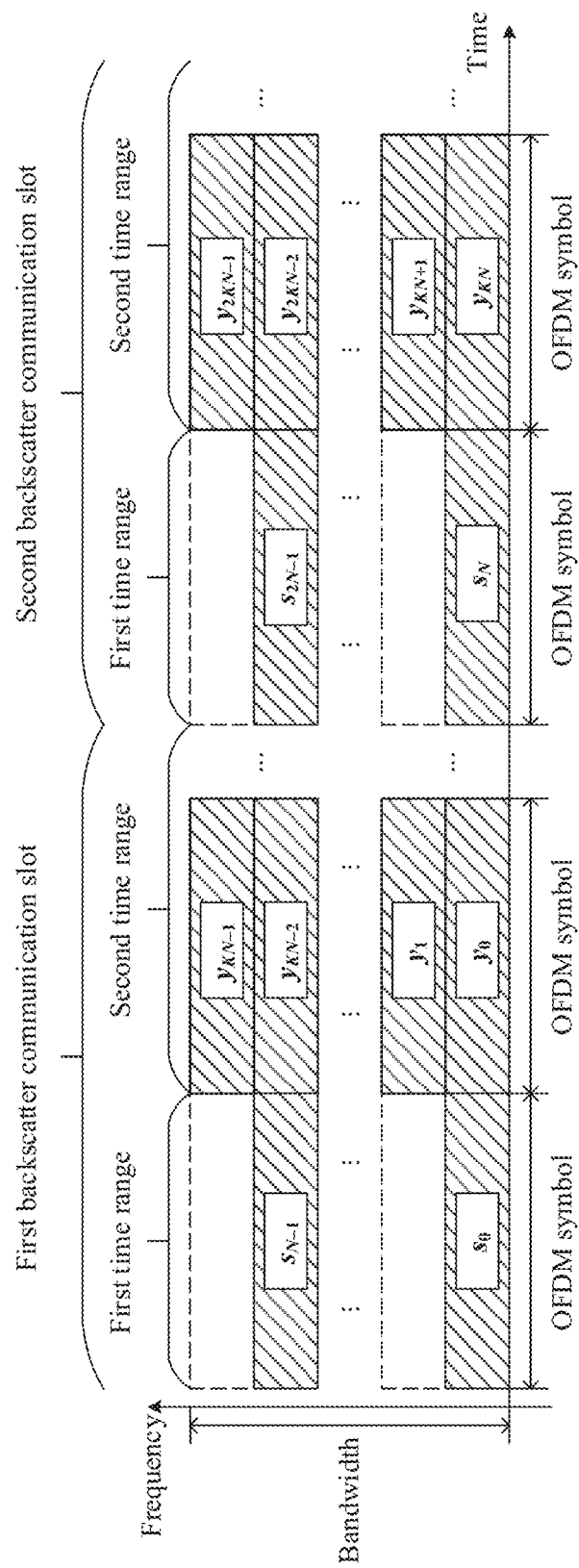
FIG. 8A, FIG. 8B, and FIG. 8C are schematic diagrams of mapping of excitation signals according to an embodiment of this application.
Figure 8B:
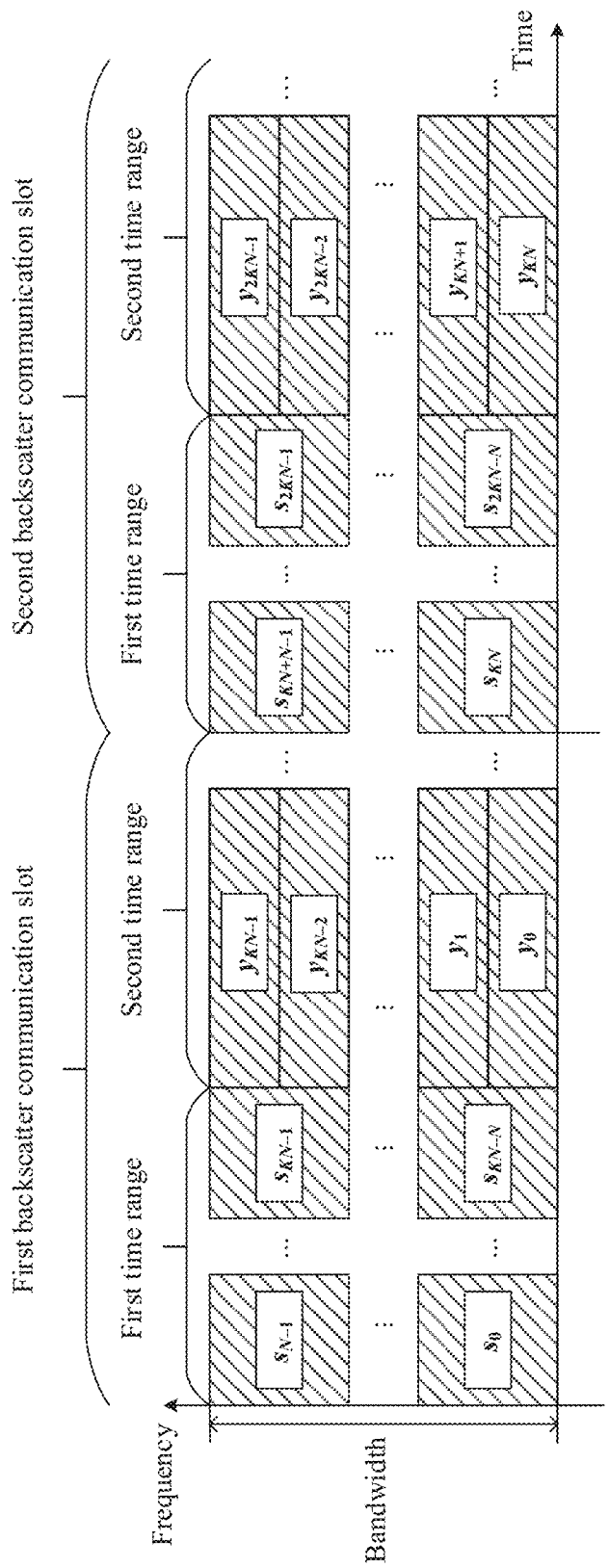

For example, as shown in FIG. 8A and FIG. 8B, different/independent sequences S and Y are respectively mapped in the first time range and the second time range. In a backscatter communication process, a specific mapping order of the sequence S in a first time range of each backscatter communication slot and backscatter communication frame is as follows: first, the sequence S is mapped to subcarriers in ascending order of subcarriers (or frequencies) in frequency domain; then is mapped in ascending order of OFDM symbols (or in ascending order of time) in the first time range of the backscatter communication slot (which is a time unit that is one level larger than the OFDM symbol); and finally is mapped in ascending order of backscatter communication slots in the backscatter communication frame (which is a time unit that is one level larger than the backscatter communication slot) until mapping of subcarriers (resources) in the first time range in the excitation signal is completed. It should be noted that comb mapping is performed in the first time range in FIG. 8A. Therefore, when mapping is performed in the first time range, mapping is performed in order at a comb interval. Mapping is continuously performed in the second time range. Therefore, when mapping is performed in the second time range, mapping may be continuously performed in order. A specific mapping order of the sequence Y is as follows: first, the sequence Y is continuously mapped to subcarriers in ascending order of subcarriers (or frequencies) in frequency domain; then is mapped in ascending order of OFDM symbols (or in ascending order of time) in a second time range of time of the backscatter communication slot (which is a time unit that is one level larger than the OFDM symbol); and finally is mapped in ascending order of backscatter communication slots in the backscatter communication frame (which is a time unit that is one level larger than the backscatter communication slot) until mapping of subcarriers (resources) in the second time range in the excitation signal is completed.

Figure 8C:
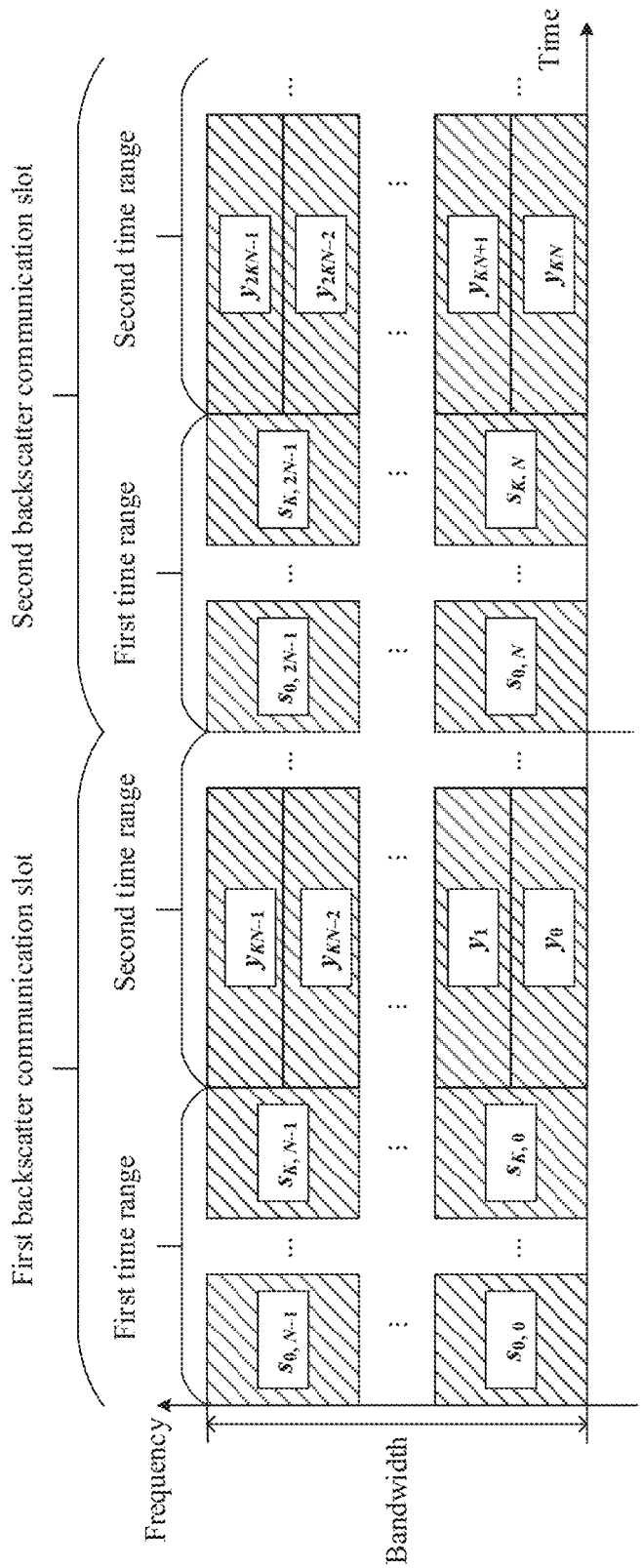

Optionally, as shown in FIG. 8C, assuming that there are K OFDM symbols in the first time range, K different/independent sequences $S_0$, $S_1$, ..., $S_{K-1}$ may be further mapped to the K OFDM symbols. In a backscatter communication process, a specific mapping order of sequences $S_0$, $S_1$, ..., $S_{K-1}$ respectively corresponding to K OFDM symbols in a first time range of each backscatter communication slot and backscatter communication frame is as follows: first, the sequences $S_0$, $S_1$, ..., $S_{K-1}$ are mapped to subcarriers in ascending order of subcarriers (or frequencies) in frequency domain; then are mapped in ascending order of OFDM symbols (or in ascending order of time) in the first time range of time of the backscatter communication slot (which is a time unit that is one level larger than the OFDM symbol), and finally are mapped in ascending order of backscatter communication slots in the backscatter communication frame (which is a time unit that is one level larger than the backscatter communication slot) until mapping of subcarriers in the first time range in the excitation signal is completed. In addition, different sequences may also be used for different OFDM symbols in the second time range, which is similar to the sequence mapping manner in the first time range in FIG. 8C. Details are not described again.

In addition, it should be understood that FIG. 7A, FIG. 7B, FIG. 8A, FIG. 8B, or FIG. 8C in this application shows only some implementations. In another implementation method, at least one sequence carried in the excitation signal may be independently generated in each backscatter communication slot, that is, sequences in backscatter communication slots are discontinuous. In another implementation method, at least one sequence carried in the excitation signal may be independently generated in each backscatter communication frame, that is, sequences in backscatter communication frames are discontinuous. In this embodiment of this application, that sequences are discontinuous means that when the sequences are generated, at least one of the following parameters is different: an initial set value (an initial value) of a generation formula or function, a formula or function, or a coefficient in the formula or function (a coefficient of a polynomial when the formula is a linear polynomial). For example, a bit corresponding to a sequence is c(n), and a generation formula may be as follows;

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

Used initial values are $x_1(n)$ and $x_2(n)$, where n=0, 1, ..., 30: and Nc, where Nc is a start position.

A coefficient in the generation formula is a coefficient on the right side of the foregoing second and third formulas, that is, a coefficient $c_{i,j}$ in $x_i(n+N)=\sum_{j=0}^{N-1}c_{i,j}x_i(n+j)$, where $i\in\{1, 2\}$, $c_{i,j}\in\{0, 1\}$, N=31. Certainly, more generally, N may be any other prime number.

In addition, before performing backscatter communication, a controller sends excitation signal configuration information and/or backscatter signal configuration information to the exciter and/or the receiver, and sends the backscatter signal configuration information to the backscatter device. The excitation signal configuration information includes information about the excitation signal in the first time range and the second time range: one or more of frequency and time information (including a signal time granularity, a length, and a periodicity), a subcarrier spacing, information about signal sending in the first time range and the second time range (information required for generating a sequence mapped in time domain and frequency domain), or the like. The backscatter signal configuration information includes information about the backscatter data signal and the backscatter reference signal: one or more of a rate, start time, a time length, a periodicity, a backscatter data bit time width, a backscatter data bit rate, a backscatter reference bit time width, a backscatter reference bit rate, or the like.

The excitation signal configuration information and/or the backscatter signal configuration information sent by the controller to the exciter or the receiver may be indicated through at least one of radio resource control (RRC) signaling, a medium access control-control element (MAC CE), a medium access control-protocol data unit (MAC PDU), downlink control information (DCI), a system message, or the like. The backscatter signal configuration information sent by the controller to the backscatter device is notified to the backscatter device through at least one of backscatter link control information, a backscatter link radio resource control message, a backscatter link medium access control message, or the like of the exciter. A backscatter link is a communication link between the exciter and the backscatter device, or a communication link among the exciter, the backscatter device, and the receiver.

Figure 9:
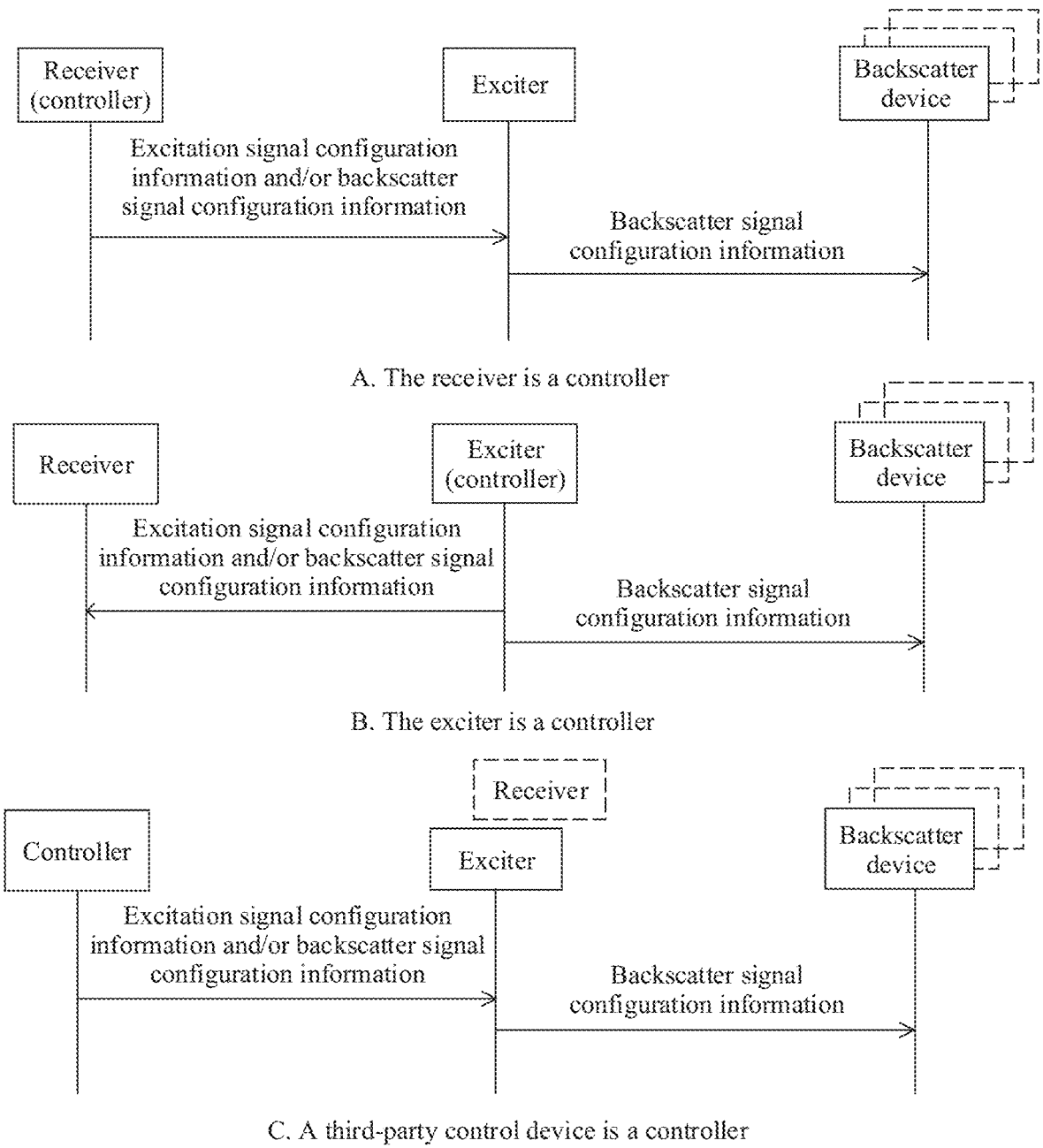
FIG. 9 is a schematic diagram of a backscatter communication configuration process according to an embodiment of this application.

In this embodiment of this application, as shown in FIG. 9, the controller may be the receiver, the exciter, or a third-party control device. The excitation signal configuration information and/or the backscatter signal configuration information are/is sent to the receiver, and may be used by the receiver to cancel an excitation signal and/or demodulate a backscatter signal. In addition, it should be understood that, if the receiver needs to send data to the backscatter device, the receiver generally first sends the data to the exciter, and the exciter forwards the data to the backscatter device. As shown in (A) in FIG. 9, when the receiver is the controller, the receiver may send the excitation signal configuration information and/or the backscatter signal configuration information to the exciter, and the exciter sends the backscatter signal configuration information to the backscatter device. As shown in (B) in FIG. 9, when the exciter is the controller, the exciter may directly send the excitation signal configuration information and/or the backscatter signal configuration information to the receiver, and send the backscatter signal configuration information to the backscatter device. As shown in (C) in FIG. 9, when the third-party control device is the controller, the controller may directly send the excitation signal configuration information and/or the backscatter signal configuration information to the exciter and the receiver, and the exciter sends the backscatter signal configuration information to the backscatter device.

S402: The backscatter device determines a backscatter signal pattern in the backscatter signal pattern set.

The backscatter signal pattern set includes a plurality of backscatter signal patterns, and backscatter reference signals in the plurality of backscatter signal patterns do not overlap in time domain. In addition, it should be understood that in this embodiment of this application, the backscatter signal pattern may include the backscatter reference signal and the backscatter data signal, and a backscatter reference signal and a backscatter data signal that are included in any backscatter signal pattern may be located on a same channel (frequency band). Different backscatter signal patterns may correspond to different channels.

In this embodiment of this application, the backscatter device modulates the backscatter reference signal in the first time range of the excitation signal and the backscatter data signal in the second time range of the excitation signal. In other words, the backscatter device reflects the reference signal in the first time range and the data signal in the second time range. Lengths of the first time range and the second time range, a signal time granularity of the backscatter reference signal in the first time range, and the signal time granularity of the backscatter data signal in the second time range may be determined based on the backscatter signal configuration information received from the exciter. The signal time granularity of the backscatter reference signal in the first time range and the signal time granularity of the backscatter data signal in the second time range for the backscatter device are generally consistent with the signal time granularity of the excitation signal in the first time range and the signal time granularity of the excitation signal in the second time range.

For example, the signal time granularity (or a backscatter device bit or backscatter device symbol time length) of the backscatter reference signal in the first time range is 1/K of the signal time granularity (or a backscatter device bit or backscatter device symbol time length) of the backscatter data signal in the second time range, where K is an integer.

Figure 10A:
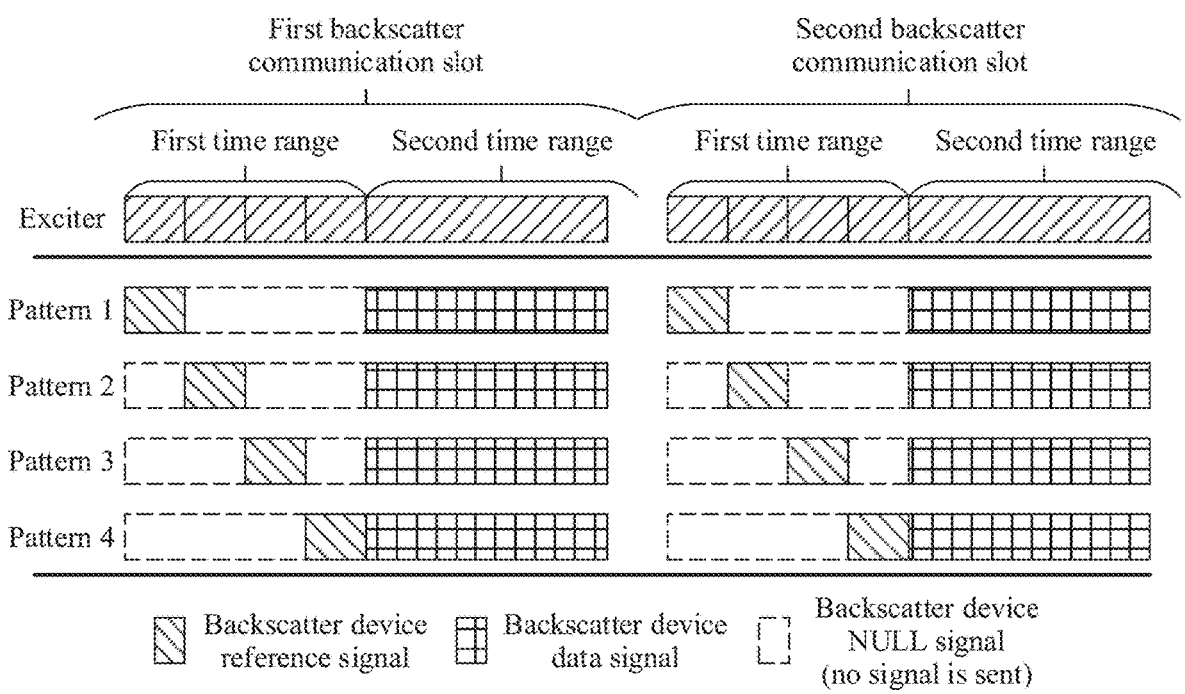
FIG. 10A and FIG. 10B are schematic structural diagrams of backscatter signal pattern sets according to an embodiment of this application.
Figure 10B:
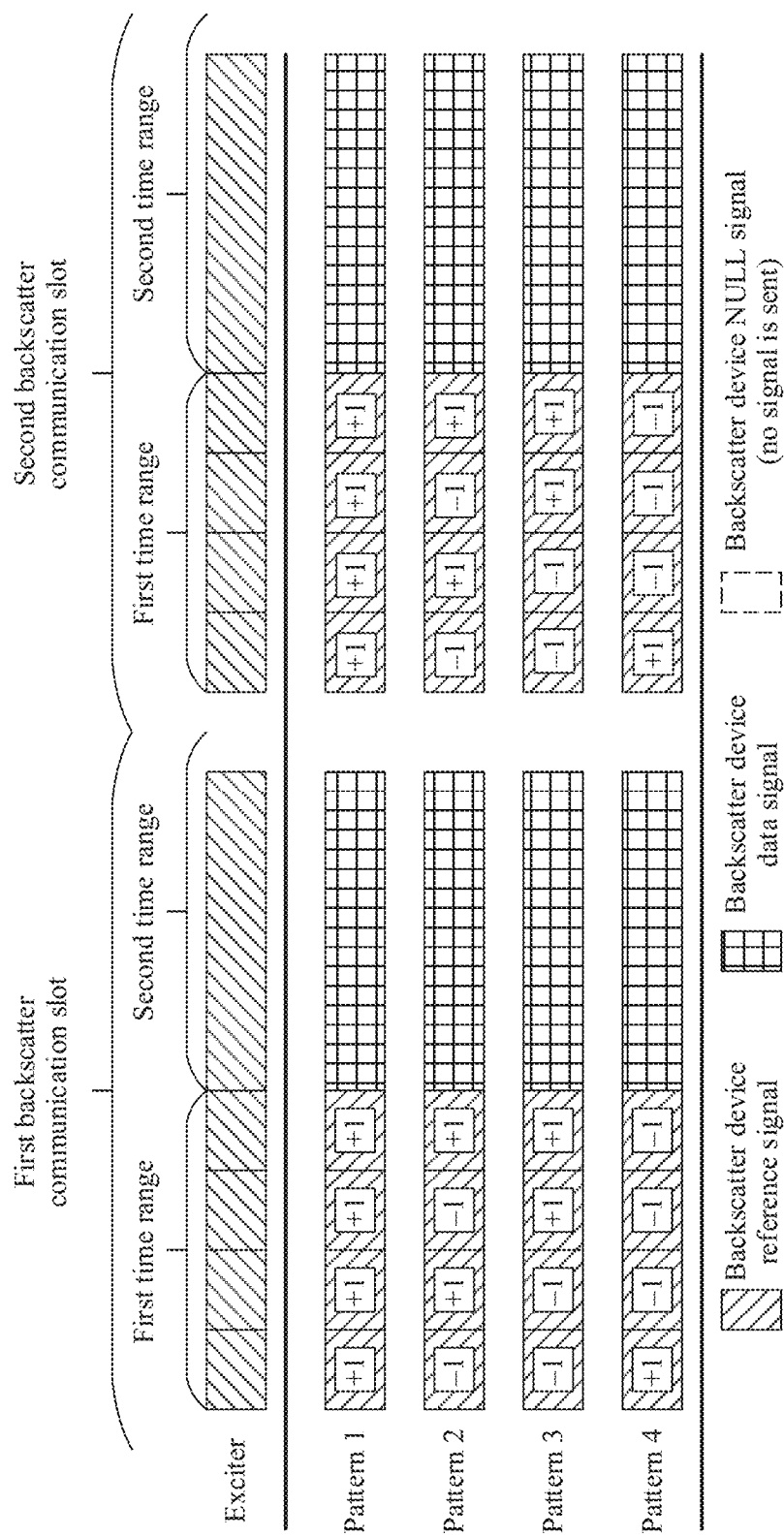

For example, the signal time granularity of the backscatter reference signal in the first time range is ¼ of the signal time granularity of the backscatter data signal in the second time range. The backscatter signal pattern set provided in this embodiment of this application may be that shown in FIG. 10A or FIG. 10B, backscatter reference signals (namely, backscatter device reference signals) in a backscatter signal pattern 1, a backscatter signal pattern 2, a backscatter signal pattern 3, and a backscatter signal pattern 4 in the backscatter signal pattern set do not overlap (are orthogonal to each other) in time domain, and backscatter data signals (namely, backscatter device data signals) in the backscatter signal pattern 1, the backscatter signal pattern 2, the backscatter signal pattern 3, and the backscatter signal pattern 4 may overlap in time domain.

Figure 11:
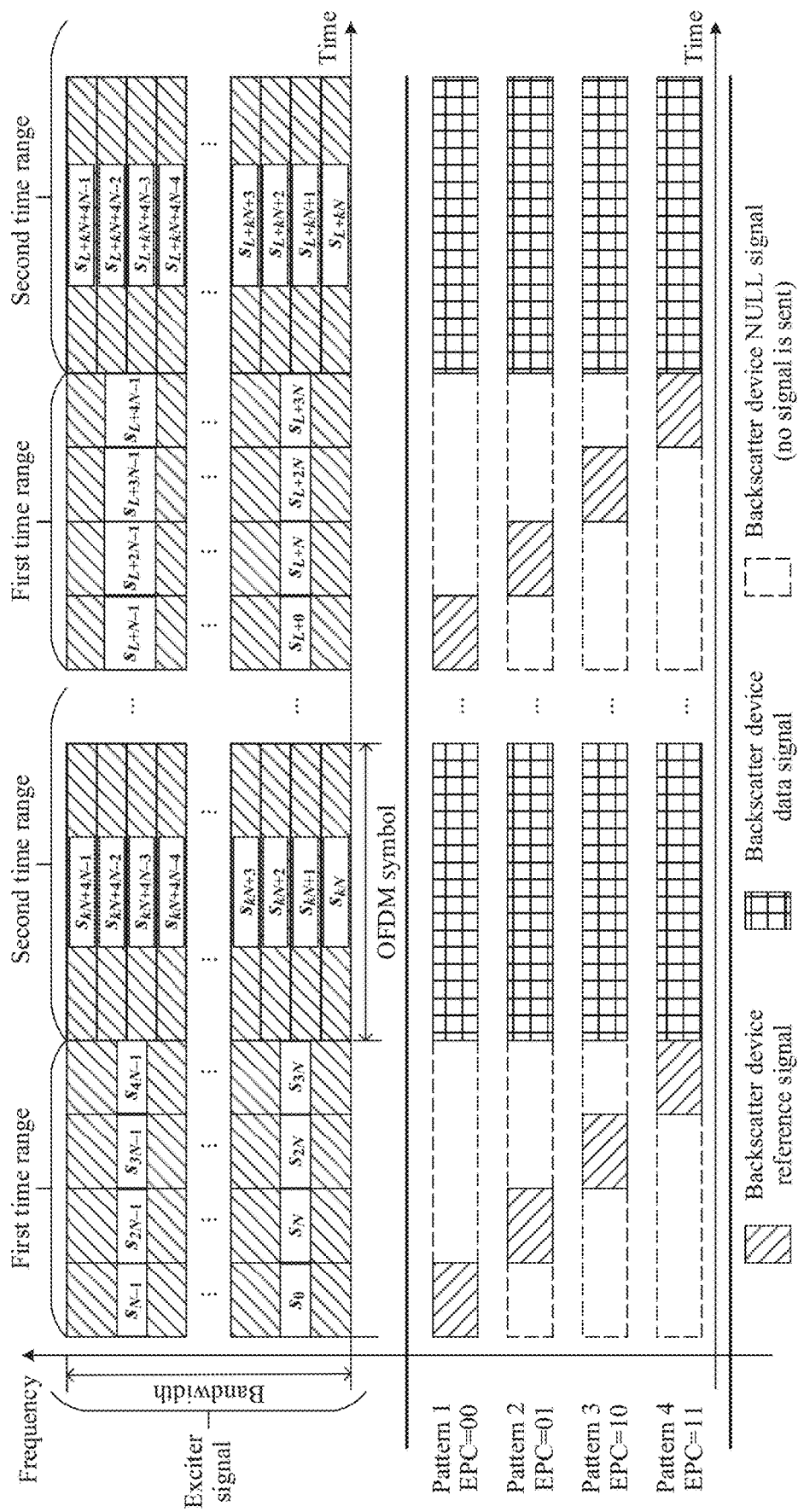
FIG. 11 is a schematic diagram of a time-frequency structure of an excitation signal and a pattern of a backscatter signal according to an embodiment of this application.

In addition, in this embodiment of this application, the backscatter device may store a plurality of different backscatter signal pattern sets. For example, K=1 corresponds to a case in which time (or duration) of the backscatter reference signal is the same as time of the backscatter data signal; K=2 corresponds to a case in which time of the backscatter reference signal is ½ of time of the backscatter data signal; K=3 corresponds to a case in which time of the backscatter reference signal is ⅓ of time of the backscatter data signal; K=4 corresponds to a case in which time of the backscatter reference signal is ¼ of time of the backscatter data signal In this embodiment of this application, the backscatter device may determine the backscatter signal pattern in the backscatter signal pattern set based on indication information received from the exciter or the receiver or identification information of the backscatter device. As shown in FIG. 11, the identification information of the backscatter device is an electronic product code (EPC) of the backscatter device, and the backscatter device determines the backscatter signal pattern in the backscatter signal pattern set based on the last two bits of the EPC. For example, if the last two bits of the EPC are 00, it corresponds to a backscatter signal pattern 1; if the last two bits of the EPC are 01, it corresponds to a backscatter signal pattern 2; if the last two bits of the EPC are 10, it corresponds to a backscatter signal pattern 3; if the last two bits of the EPC are 11, it corresponds to a backscatter signal pattern 4.

Optionally, the backscatter device determines the backscatter signal pattern (that is, determines one or more of a time pattern, a code pattern, a time-code joint pattern, or the like) in the backscatter signal pattern set based on a correspondence between a backscatter signal pattern in the backscatter signal pattern set and at least one of the following parameters: a backscatter device identifier, a backscatter communication identifier, a backscatter communication frame, a backscatter communication slot number, a random value generated by the backscatter device, or the like.

S403: The backscatter device modulates the backscatter reference signal and the backscatter data signal on the excitation signal based on the determined backscatter signal pattern, to obtain a backscatter signal.

FIG. 11 is still used as an example. It is assumed that the backscatter signal pattern determined by the backscatter device is the backscatter signal pattern 2 in FIG. 11. The backscatter device modulates the backscatter reference signal in the first time range of the excitation signal based on the backscatter signal pattern 2 at a time-frequency (time domain and frequency domain) position of the backscatter reference signal in the first time range, and modulates the backscatter data signal in the second time range of the excitation signal based on the backscatter signal pattern 2 at a time-frequency (time domain and frequency domain) position of the backscatter data signal in the second time range, to obtain the backscatter signal.

S404: The backscatter device sends the backscatter signal to the receiver, and the receiver receives the backscatter signal.

S405: The receiver detects, based on the backscatter signal pattern set, the backscatter reference signal modulated on the backscatter signal.

After receiving the backscatter signal sent by the backscatter device, the receiver may detect (demodulate), in the first time range of the backscatter signal based on channels (frequency bands) corresponding to the plurality of backscatter signal patterns in the backscatter signal pattern set, the backscatter reference signal modulated on the backscatter signal, and estimate, based on whether the backscatter reference signal is detected, a channel on which the backscatter device sends the backscatter data signal. To be specific, if the backscatter reference signal modulated on the backscatter signal is detected on a channel, it indicates that the backscatter device sends the backscatter data signal on the channel. For example, as shown in FIG. 11, in the backscatter signal pattern 1, the backscatter signal pattern 2, the backscatter signal pattern 3, and the backscatter signal pattern 4, backscatter reference signals (namely, backscatter device reference signals) do not overlap in time domain, the receiver may simultaneously detect the backscatter reference signals on a channel 1, a channel 2, a channel 3, and a channel 4 respectively corresponding to the backscatter signal pattern 1, the backscatter signal pattern 2, the backscatter signal pattern 3, and the backscatter signal pattern 4, and no signal conflict occurs. When the receiver detects the backscatter reference signal on a channel, it indicates that the backscatter device sends the backscatter data signal (namely, the backscatter device data signal) on the channel, and the receiver may demodulate the backscatter data signal based on the channel on which the backscatter reference signal is detected.

S406: The receiver demodulates, based on a channel on which the backscatter reference signal is detected, the backscatter data signal modulated on the backscatter signal.

After determining, based on whether the backscatter reference signal is detected, the channel on which the backscatter device sends the backscatter data signal, the receiver demodulates the backscatter data signal modulated on the backscatter signal on the corresponding channel, to obtain backscatter data reflected by the backscatter device. For example, the receiver demodulates, based on the channel on which the backscatter reference signal is detected, the backscatter data signal modulated in the second time range of the backscatter signal received through the channel, to obtain the backscatter data reflected by the backscatter device.

Embodiment 2

The foregoing mainly describes the solutions provided in this application from a perspective of interaction among the exciter, the backscatter device, and the receiver. It may be understood that, to implement the foregoing functions, each network element includes a corresponding hardware structure and/or software module (or unit) for performing each function. Persons skilled in the art should easily be aware that, in combination with the units and algorithm steps in the examples described in embodiments disclosed in this specification, this application can be implemented by hardware or a combination of hardware and computer software. Whether a function is performed by hardware or hardware driven by computer software depends on particular applications and design constraint conditions of the technical solutions. Persons skilled m the art may use different methods to implement the described functions for each particular application, but it should not be considered that the implementation goes beyond the scope of this application.

Figure 12:
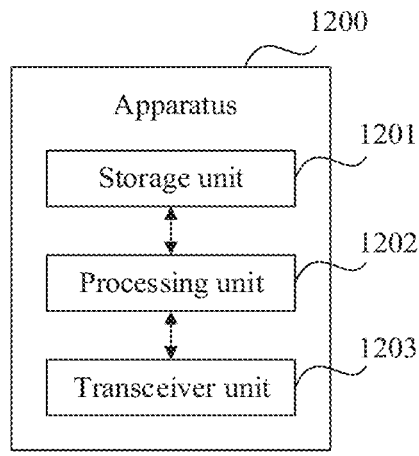
FIG. 12 is a schematic block diagram of a communication apparatus according to an embodiment of this application.

When an integrated unit (module) is used, FIG. 12 is a possible schematic block diagram of a communication apparatus according to an embodiment of this application. The communication apparatus 1200 may exist in a form of software. The apparatus 1200 may include a processing unit 1202 and a transceiver unit 1203.

In a possible design, the processing unit 1202 is configured to implement a corresponding processing function. The transceiver unit 1203 is configured to support the apparatus 1200 in communicating with another network entity. Optionally, the transceiver unit 1203 may include a receiving unit and/or a sending unit, which are respectively configured to perform a receiving operation and a sending operation. Optionally, the apparatus 1200 may further include a storage unit 1201, configured to store program code and/or data of the apparatus 1200.

The apparatus 1200 may be the backscatter device in any one of the foregoing embodiments (where for example, the backscatter device is the backscatter device in Embodiment 1), or may be a component, such as a chip, disposed in the backscatter device. The processing unit 1202 may support the apparatus 1200 in performing actions of the backscatter device in the foregoing method examples. Alternatively, the processing unit 1202 mainly performs internal actions of the backscatter device in the method examples, and the transceiver unit 1203 may support communication between the apparatus 1200 and the exciter and between the apparatus 1200 and the transceiver.

Specifically, in an embodiment, the transceiver unit 1203 is configured to receive an excitation signal from an exciter. The processing unit 1202 is configured to determine a backscatter signal pattern in a backscatter signal pattern set, where the backscatter signal pattern set includes a plurality of backscatter signal patterns, and backscatter reference signals in the plurality of backscatter signal patterns do not overlap in time domain.

The processing unit 1202 may be further configured to modulate a backscatter reference signal and a backscatter data signal on the excitation signal based on the determined backscatter signal pattern, to obtain a backscatter signal. The transceiver unit 1203 is further configured to send the backscatter signal to the receiver.

In a possible design, the excitation signal includes a first time range and a second time range, and a signal time granularity of the excitation signal in the first time range is different from a signal time granularity of the excitation signal in the second time range. Specifically, the signal time granularity of the excitation signal in the first time range may be less than the signal time granularity of the excitation signal in the second time range.

In a possible design, the excitation signal may be mapped in a comb pattern in the first time range and may be continuously mapped in the second time range. Specifically, a subcarrier spacing used for the excitation signal in the first time range may be K times a subcarrier spacing used for the excitation signal in the second time range; or an orthogonal frequency division multiplexing OFDM symbol length used for the excitation signal in the first time range may be 1/K time an OFDM symbol length used for the excitation signal in the second time range, where K is an integer.

In a possible design, when modulating the backscatter reference signal and the backscatter data signal on the excitation signal based on the determined backscatter signal pattern, the processing unit 1202 may specifically modulate the backscatter reference signal in the first time range of the excitation signal and the backscatter data signal in the second time range of the excitation signal based on the determined backscatter signal pattern.

In a possible design, a first sequence mapped to the excitation signal is continuous in the first time range, and a second sequence mapped to the excitation signal is continuous in the second time range; or a third sequence mapped to the excitation signal is continuous in the first time range and the second time range.

In a possible design, when determining the backscatter signal pattern in the backscatter signal pattern set, the processing unit 1202 may specifically determine the backscatter signal pattern in the backscatter signal pattern set based on identification information of a backscatter device: determine the backscatter signal pattern in the backscatter signal pattern set based on identification information of a backscatter device and a correspondence between identification information of a backscatter device and a backscatter signal pattern in the backscatter signal pattern set, or determine the backscatter signal pattern in the backscatter signal pattern set based on backscatter signal indication information received from the exciter or the receiver, where the backscatter signal indication information includes indication information indicating a backscatter signal pattern in the backscatter signal pattern set.

Figure 13:
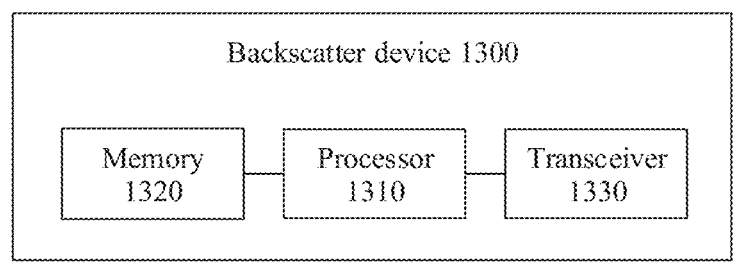
FIG. 13 is a schematic block diagram of a backscatter device according to an embodiment of this application.

As shown in FIG. 13, an embodiment of this application further provides a backscatter device 1300. The backscatter device 1300 includes a processor 1310, a memory 1320, and a transceiver 1330. In a possible design, the memory 1320 stores instructions, a program, or data, and the memory 1320 may be configured to implement a function of the storage unit 1201 in the foregoing embodiment. The processor 1310 is configured to read the instructions, the program, or the data stored in the memory 1320. When the instructions or the program stored in the memory 1320 is executed, the processor 1310 is configured to perform an operation performed by the processing unit 1202 in the foregoing embodiment, and the transceiver 1330 is configured to perform an operation performed by the transceiver unit 1203 in the foregoing embodiment.

It should be understood that the communication apparatus 1200 or the backscatter device 1300 in embodiments of this application may correspond to the backscatter device in the communication method (FIG. 4) in embodiments of this application, and in addition, operations and/or functions of the modules in the communication apparatus 1200 or the backscatter device 1300 are intended to implement corresponding procedures of the method in FIG. 4. For brevity, details are not described herein again.

Figure 14:
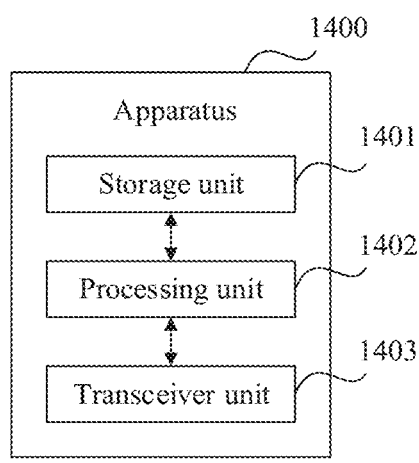
FIG. 14 is a schematic block diagram of a communication apparatus according to an embodiment of this application.

When an integrated unit (module) is used, FIG. 14 is a possible schematic block diagram of another communication apparatus according to an embodiment of this application. The communication apparatus 1400 may exist in a form of software. The apparatus 1400 may include a processing unit 1402 and a transceiver unit 1403. In a possible design, the processing unit 1402 is configured to implement a corresponding processing function. The transceiver unit 1403 is configured to support the apparatus 1400 in communicating with another network entity. Optionally, the transceiver unit 1403 may include a receiving unit and/or a sending unit, which are respectively configured to perform a receiving operation and a sending operation. Optionally, the apparatus 1400 may further include a storage unit 1401, configured to store program code and/or data of the apparatus 1400.

The apparatus 1400 may be the exciter in any one of the foregoing embodiments (where for example, the exciter is the exciter in Embodiment 1), or may be a component, such as a chip, disposed in the exciter. The processing unit 1402 may support the apparatus 1400 in performing actions of the exciter in the foregoing method examples. Alternatively, the processing unit 1402 mainly performs internal actions of the exciter in the method examples, and the transceiver unit 1403 may support communication between the apparatus 1400 and the backscatter device and between the apparatus 1400 and the receiver.

Specifically, in an embodiment, the processing unit 1402 is configured to generate an excitation signal, where the excitation signal includes a first time range and a second time range, and a signal time granularity of the excitation signal in the first time range is different from a signal time granularity of the excitation signal in the second time range. The transceiver unit 1403 is configured to send the excitation signal to a backscatter device.

In a possible design, the signal time granularity of the excitation signal in the first time range may be less than the signal time granularity of the excitation signal in the second time range.

In a possible design, the excitation signal is mapped in a comb pattern in the first time range and is continuously mapped in the second time range. Specifically, a subcarrier spacing used for the excitation signal in the first time range may be K times a subcarrier spacing used for the excitation signal in the second time range; or an orthogonal frequency division multiplexing (OFDM) symbol length used for the excitation signal in the first time range may be 1/K time an OFDM symbol length used for the excitation signal in the second time range, where K is an integer.

In a possible design, a first sequence mapped to the excitation signal is continuous in the first time range, and a second sequence mapped to the excitation signal is continuous in the second time range; or a third sequence mapped to the excitation signal is continuous in the first time range and the second time range.

Figure 15:
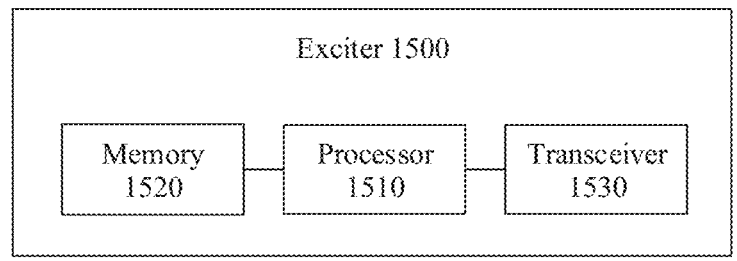
FIG. 15 is a schematic block diagram of an exciter according to an embodiment of this application.

As shown in FIG. 15, an embodiment of this application further provides an exciter 1500. The exciter 1500 includes a processor 1510, a memory 1520, and a transceiver 1530. In a possible design, the memory 1520 stores instructions, a program, or data, and the memory 1520 may be configured to implement a function of the storage unit 1401 in the foregoing embodiment. The processor 1510 is configured to read the instructions, the program, or the data stored in the memory 1520. When the instructions or the program stored in the memory 1520 is executed, the processor 1510 is configured to perform an operation performed by the processing unit 1402 in the foregoing embodiment, and the transceiver 1530 is configured to perform an operation performed by the transceiver unit 1403 in the foregoing embodiment.

It should be understood that the communication apparatus 1400 or the exciter 1500 in embodiments of this application may correspond to the exciter in the communication method (FIG. 4) in embodiments of this application, and in addition, operations and/or functions of the modules in the communication apparatus 1400 or the exciter 1500 are intended to implement corresponding procedures of the method in FIG. 4. For brevity, details are not described herein again.

Figure 16:
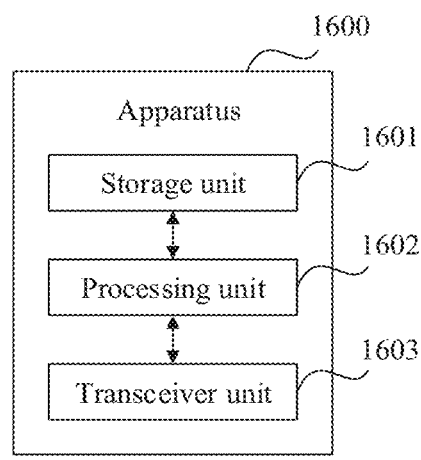
FIG. 16 is a schematic block diagram of a communication apparatus according to an embodiment of this application.

When an integrated unit (module) is used, FIG. 16 is a possible schematic block diagram of another communication apparatus according to an embodiment of this application. The communication apparatus 1600 may exist in a form of software. The apparatus 1600 may include a processing unit 1602 and a transceiver unit 1603.

In a possible design, the processing unit 1602 is configured to implement a corresponding processing function. The transceiver unit 1603 is configured to support the apparatus 1600 in communicating with another network entity. Optionally, the transceiver unit 1603 may include a receiving unit and/or a sending unit, which are respectively configured to perform a receiving operation and a sending operation. Optionally, the apparatus 1600 may further include a storage unit 1601, configured to store program code and/or data of the apparatus 1600.

The apparatus 1600 may be the receiver in any one of the foregoing embodiments (where for example, the receiver is the receiver in Embodiment 1), or may be a component, such as a chip, disposed in the receiver. The processing unit 1602 may support the apparatus 1600 in performing actions of the receiver in the foregoing method examples. Alternatively, the processing unit 1602 mainly performs internal actions of the receiver in the method examples, and the transceiver unit 1603 may support communication between the apparatus 1600 and the exciter and between the apparatus 1600 and the backscatter device.

Specifically, in an embodiment, the transceiver unit 1603 is configured to receive a backscatter signal from a backscatter device. The processing unit 1602 is configured to detect, based on a backscatter signal pattern set, a backscatter reference signal modulated on the backscatter signal, where the backscatter signal pattern set includes a plurality of backscatter signal patterns, and the backscatter reference signals in the plurality of backscatter signal patterns do not overlap in time domain. The processing unit 1602 is further configured to demodulate, based on a channel on which the backscatter reference signal is detected, a backscatter data signal modulated on the backscatter signal.

In a possible design, the backscatter signal includes a first time range and a second time range, and a signal time granularity of the backscatter signal in the first time range may be different from a signal time granularity of the backscatter signal in the second time range. Specifically, the signal time granularity of the backscatter signal in the first time range may be less than the signal time granularity of the backscatter signal in the second time range.

In a possible design, when detecting, based on the backscatter signal pattern set, the backscatter reference signal modulated on the backscatter signal, the processing unit 1602 may specifically detect, in the first time range of the backscatter signal based on the backscatter signal pattern set, the backscatter reference signal modulated on the backscatter signal; and when demodulating, based on the channel on which the backscatter reference signal is detected, the backscatter data signal modulated on the backscatter signal, the processing unit 1602 may specifically demodulate, in the second time range of the backscatter signal based on the channel on which the backscatter reference signal is detected, the backscatter data signal modulated on the backscatter signal.

Figure 17:
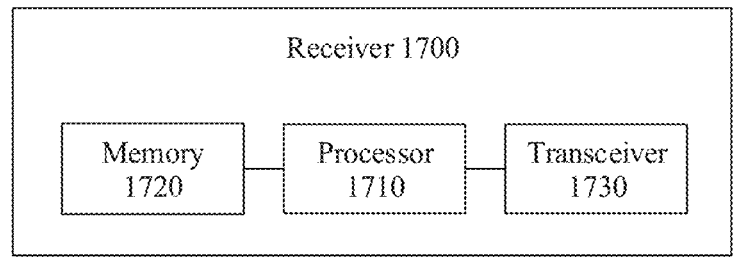
FIG. 17 is a schematic block diagram of a receiver according to an embodiment of this application.

As shown in FIG. 17, an embodiment of this application further provides a receiver 1700. The receiver 1700 includes a processor 1710, a memory 1720, and a transceiver 1730. In a possible design, the memory 1720 stores instructions, a program, or data, and the memory 1720 may be configured to implement a function of the storage unit 1601 in the foregoing embodiment. The processor 1710 is configured to read the instructions, the program, or the data stored in the memory 1720. When the instructions or the program stored in the memory 1720 is executed, the processor 1710 is configured to perform an operation performed by the processing unit 1602 in the foregoing embodiment, and the transceiver 1730 is configured to perform an operation performed by the transceiver unit 1603 in the foregoing embodiment.

It should be understood that the communication apparatus 1600 or the receiver 1700 in embodiments of this application may correspond to the receiver in the communication method (FIG. 4) in embodiments of this application, and in addition, operations and/or functions of the modules in the communication apparatus 1600 or the receiver 1700 are intended to implement corresponding procedures of the method in FIG. 4. For brevity, details are not described herein again.

Figure 18:
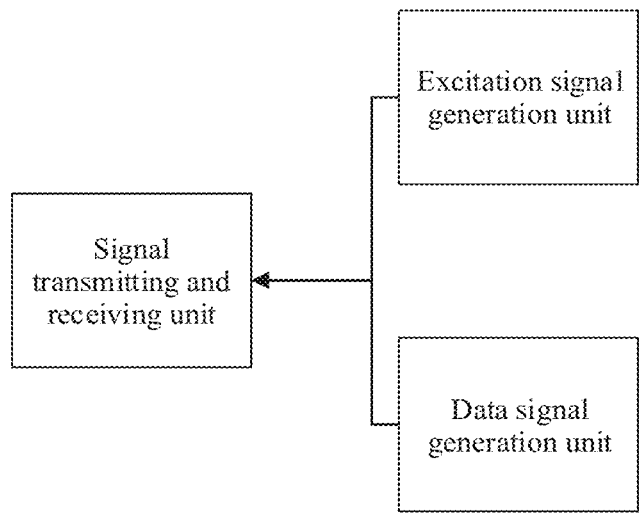
FIG. 18 is a schematic structural diagram of an exciter according to an embodiment of this application.

FIG. 18 is a schematic structural diagram of an exciter according to this application. A signal transmitting and receiving unit in the exciter is configured to transmit and receive a signal. An excitation signal generation unit is configured to generate a transmitted excitation signal. A data signal generation unit is configured to generate a transmitted data signal.

In another form of this embodiment, a computer-readable storage medium is provided. The computer-readable storage medium stores a program or instructions. When the program or the instructions are executed, the method on an exciter side in the foregoing method embodiment may be performed.

In another form of this embodiment, a computer program product including instructions is provided. When the instructions are executed, the method on an exciter side in the foregoing method embodiment may be performed.

In another form of this embodiment, a chip is provided, configured to execute a computer program or instructions stored in a memory. When the computer program or the instructions are executed, the method on an exciter side in the foregoing method embodiment may be performed.

Figure 19:
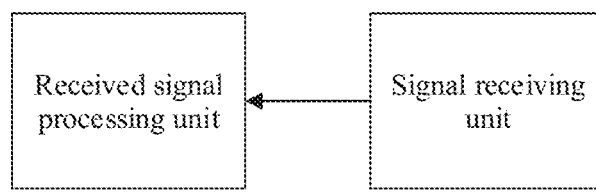
FIG. 19 is a schematic structural diagram of a receiver according to an embodiment of this application.

FIG. 19 is a schematic structural diagram of a receiver according to this application. A signal receiving unit of the receiver is configured to receive a signal, and a received signal processing unit is configured to process the received signal.

In another form of this embodiment, a computer-readable storage medium is provided. The computer-readable storage medium stores a program or instructions. When the program or the instructions are executed, the method on a receiver side in the foregoing method embodiment may be performed.

In another form of this embodiment, a computer program product including instructions is provided. When the instructions are executed, the method on a receiver side in the foregoing method embodiment may be performed.

In another form of this embodiment, a chip is provided, configured to execute a computer program or instructions stored in a memory. When the computer program or the instructions are executed, the method on a receiver side in the foregoing method embodiment may be performed.

Figure 20:
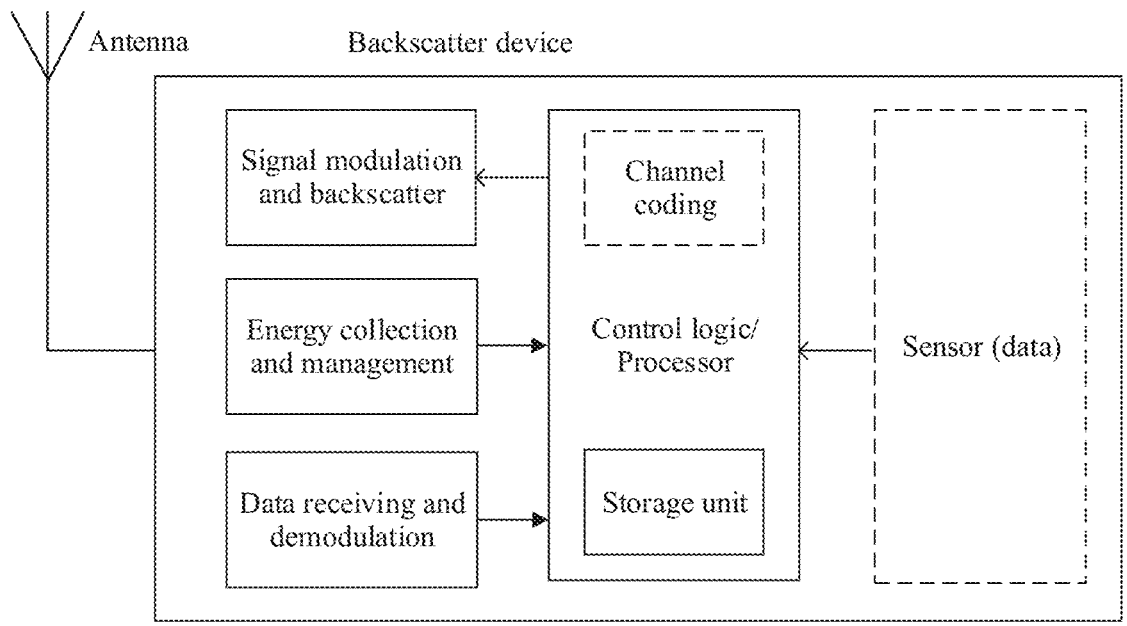
FIG. 20 is a schematic structural diagram of a backscatter device according to an embodiment of this application.

FIG. 20 is a schematic structural diagram of a backscatter device according to this application. The backscatter device includes data receiving and demodulation, energy collection and management, signal modulation and backscatter, and control logic or a processor (further including a storage unit and an optional channel coding module). The backscatter device may further be connected to a sensor or sensor data, so that the backscatter device can transmit data collected by the sensor. The data reflected by the backscatter device may be an identifier (for example, RFID or an EPC), or may be other data (for example, data such as temperature and humidity collected by the sensor). When receiving energy, an internal circuit of the backscatter device is connected to an energy collection and management module; and when reflecting a signal, the internal circuit of the backscatter device is connected to a signal modulation and backscatter module. Certainly, some sensors perform both energy collection and signal modulation and backscatter. The control logic or the processor (also referred to as a microprocessor) in the backscatter device mainly performs data receiving processing and data backscatter processing.

In another form of this embodiment, a computer-readable storage medium is provided. The computer-readable storage medium stores a program or instructions. When the program or the instructions are executed, the method on a backscatter device side in the foregoing method embodiment may be performed.

In another form of this embodiment, a computer program product including instructions is provided. When the instructions are executed, the method on a backscatter device side in the foregoing method embodiment may be performed.

In another form of this embodiment, a chip is provided, configured to execute a computer program or instructions stored in a memory. When the computer program or the instructions are executed, the method on a backscatter device side in the foregoing method embodiment may be performed.

Persons skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although some specific embodiments of this application have been described, persons skilled in the art can make changes and modifications to these embodiments once they learn of the basic inventive concept. Therefore, the following claims are intended to be construed as covering the specific embodiments and all changes and modifications falling within the scope of this application.

Clearly, persons skilled in the art can make various modifications and variations to embodiments of this application without departing from the spirit and scope of embodiments of this application. In this way, this application is intended to cover these modifications and variations of embodiments of this application provided that they fall within the scope of the claims of this application and their equivalent technologies.

What is claimed is:

1. An apparatus, comprising:
one or more processors; and
a memory having instructions stored thereon that, when executed by the one or more processors, cause the apparatus to:
receive an excitation signal from an exciter;
select a backscatter signal pattern in a backscatter signal pattern set based on backscatter signal indication information received from the exciter, wherein the backscatter signal indication information indicates the backscatter signal pattern to be selected in the backscatter signal pattern set, wherein the backscatter signal pattern set comprises a plurality of backscatter signal patterns, and backscatter reference signals in the plurality of backscatter signal patterns do not overlap in time domain, and wherein the backscatter signal pattern set comprises a first backscatter signal pattern and a second backscatter signal pattern, the first backscatter signal pattern has a first ratio between a time of a first backscatter reference signal and a first backscatter data signal, the second backscatter signal pattern has a second ratio between a time of a second backscatter reference signal and a second backscatter data signal, and the first ratio is different from the second ratio;
modulate a backscatter reference signal and a backscatter data signal on the excitation signal based on the selected backscatter signal pattern, to obtain a backscatter signal; and
send the backscatter signal to a receiver.

2. The apparatus according to claim 1, wherein the excitation signal comprises a first time range and a second time range, and a signal time granularity of the excitation signal in the first time range is less than a signal time granularity of the excitation signal in the second time range.

3. The apparatus according to claim 2, wherein the excitation signal is mapped in a comb pattern in the first time range and is continuously mapped in the second time range.

4. The apparatus according to claim 3, wherein the instructions, when executed by the one or more processors, cause the apparatus to modulate the backscatter reference signal in the first time range of the excitation signal and the backscatter data signal in the second time range of the excitation signal based on the selected backscatter signal pattern.

5. The apparatus according to claim 2, wherein a subcarrier spacing used for the excitation signal in the first time range is K times a subcarrier spacing used for the excitation signal in the second time range; or
an orthogonal frequency division multiplexing (OFDM) symbol length used for the excitation signal in the first time range is 1/K time an OFDM symbol length used for the excitation signal in the second time range, wherein K is an integer.

6. The apparatus according to claim 5, wherein the instructions, when executed by the one or more processors, cause the apparatus to modulate the backscatter reference signal in the first time range of the excitation signal and the backscatter data signal in the second time range of the excitation signal based on the selected backscatter signal pattern.

7. The apparatus according to claim 2, wherein the instructions, when executed by the one or more processors, cause the apparatus to modulate the backscatter reference signal in the first time range of the excitation signal and the backscatter data signal in the second time range of the excitation signal based on the selected backscatter signal pattern.

8. The apparatus according to claim 2, wherein a first sequence mapped to the excitation signal is continuous in the first time range, and a second sequence mapped to the excitation signal is continuous in the second time range.

9. The apparatus according to claim 2, wherein a third sequence mapped to the excitation signal is continuous in the first time range and the second time range.

10. An apparatus, comprising:
one or more processors; and
a memory having instructions stored thereon that, when executed by the one or more processors, cause the apparatus to:
generate an excitation signal, wherein the excitation signal comprises a first time range and a second time range, and a signal time granularity of the excitation signal in the first time range 1s less than a signal time granularity of the excitation signal in the second time range;
send the excitation signal to a backscatter device, wherein the backscatter device modulates a backscatter reference signal and a backscatter data signal on the excitation signal based on a backscatter signal pattern selected from a backscatter signal pattern set, wherein the backscatter signal pattern set comprises a first backscatter signal pattern and a second backscatter signal pattern, the first backscatter signal pattern has a first ratio between a time of a first backscatter reference signal and a first backscatter data signal, the second backscatter signal pattern has a second ratio between a time of a second backscatter reference signal and a second backscatter data signal, and the first ratio is different from the second ratio; and
send backscatter signal indication information, wherein the backscatter signal indication information indicates a backscatter signal pattern to be selected in the backscatter signal pattern set.

11. The apparatus according to claim 10, wherein the excitation signal is mapped in a comb pattern in the first time range and is continuously mapped in the second time range.

12. The apparatus according to claim 10, wherein a subcarrier spacing used for the excitation signal in the first time range is K times a subcarrier spacing used for the excitation signal in the second time range.

13. The apparatus according to claim 10, wherein an orthogonal frequency division multiplexing (OFDM) symbol length used for the excitation signal in the first time range is 1/K time an OFDM symbol length used for the excitation signal in the second time range, wherein K is an integer.

14. The apparatus according to claim 10, wherein a first sequence mapped to the excitation signal is continuous in the first time range, and a second sequence mapped to the excitation signal is continuous in the second time range.

15. The apparatus according to claim 10, a third sequence mapped to the excitation signal is continuous in the first time range and the second time range.

16. An apparatus, comprising:
one or more processors; and
a memory having instructions stored thereon that, when executed by the one or more processors, cause the apparatus to:
receive a backscatter signal from a backscatter device;
detect, based on a backscatter signal pattern set, a backscatter reference signal modulated on the backscatter signal, wherein the backscatter signal pattern set comprises a plurality of backscatter signal patterns, and backscatter reference signals in the plurality of backscatter signal patterns do not overlap in time domain, and wherein the backscatter signal pattern set comprises a first backscatter signal pattern and a second backscatter signal pattern, the first backscatter signal pattern has a first ratio between a time of a first backscatter reference signal and a first backscatter data signal, the second backscatter signal pattern has a second ratio between a time of a second backscatter reference signal and a second backscatter data signal, and the first ratio is different from the second ratio, and a backscatter signal pattern of the backscatter signal is selected based on backscatter signal indication information from an exciter, wherein the backscatter signal indication information indicates the backscatter signal pattern to be selected in the backscatter signal pattern set; and demodulate, based on a channel on which the backscatter reference signal is detected, a backscatter data signal modulated on the backscatter signal.

17. The apparatus according to claim 16, wherein the backscatter signal comprises a first time range and a second time range, and a signal time granularity of the backscatter signal in the first time range is less than a signal time granularity of the backscatter signal in the second time range.

18. The apparatus according to claim 17, wherein the instructions, when executed by the one or more processors, cause the apparatus to:
detect, in the first time range of the backscatter signal based on the backscatter signal pattern set, the backscatter reference signal modulated on the backscatter signal; and
demodulate, in the second time range of the backscatter signal based on the channel on which the backscatter reference signal is detected, the backscatter data signal modulated on the backscatter signal.

19. The apparatus according to claim 17, wherein the backscatter reference signal is modulated in the first time range of an excitation signal and the backscatter data signal is modulated in the second time range of the excitation signal based on the backscatter signal pattern.

20. The apparatus according to claim 19, wherein the excitation signal is mapped in a comb pattern in the first time range and is continuously mapped in the second time range.

* * * * *

UNITED STATES PATENT AND TRADEMARK OFFICE
CERTIFICATE OF CORRECTION

| | | |
|---|---|---|
| PATENT NO. | : 12,360,066 B2 | Page 1 of 1 |
| APPLICATION NO. | : 17/891716 | |
| DATED | : July 15, 2025 | |
| INVENTOR(S) | : Mao Yan et al. | |

It is certified that error appears in the above-identified patent and that said Letters Patent is hereby corrected as shown below:

In the Claims

In Column 24, In Line 19, In Claim 10, delete "1s" and insert -- is --.

Signed and Sealed this
Twenty-third Day of December, 2025

John A. Squires
*Director of the United States Patent and Trademark Office*